(12) United States Patent
Wang et al.

(10) Patent No.: US 11,752,873 B2
(45) Date of Patent: *Sep. 12, 2023

(54) DISPLAY DEVICE AND VEHICLE

(71) Applicant: Shanghai AVIC Optoelectronics Co., Ltd., Shanghai (CN)

(72) Inventors: Ming Wang, Shanghai (CN); Feng Qin, Shanghai (CN)

(73) Assignee: Shanghai AVIC Optoelectronics Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,354

(22) Filed: Aug. 29, 2022

(65) Prior Publication Data
US 2022/0410714 A1 Dec. 29, 2022

Related U.S. Application Data

(63) Continuation of application No. 17/016,776, filed on Sep. 10, 2020, now Pat. No. 11,458,842.

(30) Foreign Application Priority Data
Jun. 30, 2020 (CN) .......................... 202010622483.4

(51) Int. Cl.
H02J 50/10 (2016.01)
B60K 37/06 (2006.01)

(52) U.S. Cl.
CPC .............. B60K 37/06 (2013.01); H02J 50/10 (2016.02); B60K 2370/126 (2019.05); B60K 2370/145 (2019.05); B60K 2370/42 (2019.05); B60K 2370/47 (2019.05); B60K 2370/816 (2019.05)

(58) Field of Classification Search
CPC ................ B60K 37/06; B60K 2370/47; B60K 2370/816; B60K 2370/145; B60K 2370/42; B60K 2370/126; H02J 50/10
See application file for complete search history.

(56) References Cited

U.S. PATENT DOCUMENTS

2021/0039496 A1* 2/2021 Sung ........................ G10L 15/22
2021/0109605 A1* 4/2021 Ferren ....................... G06F 3/01

FOREIGN PATENT DOCUMENTS

| CN | 107526474 A | 12/2017 |
| CN | 110196706 A | 9/2019 |
| CN | 209748520 U | 12/2019 |
| CN | 111252008 A | 6/2020 |

* cited by examiner

Primary Examiner — Robert J Michaud
(74) Attorney, Agent, or Firm — KDW Firm PLLC

(57) ABSTRACT

Provided are a display panel and a vehicle. The display device includes a knob and a display panel; the knob includes a first magnetic adhering piece; the display device further includes a second magnetic adhering structure, and the second magnetic adhering structure is disposed on a non-light exiting side of the display panel; the second magnetic adhering structure includes a plurality of first magnetic adhering regions, and at least two first magnetic adhering regions are not overlapped; when the knob is magnetically adhered to any one of the plurality of first magnetic adhering regions, the knob is disposed on a light exiting side of the display panel.

20 Claims, 14 Drawing Sheets

DISPLAY DEVICE AND VEHICLE

CROSS-REFERENCE TO RELATED APPLICATIONS

This application is a continuation of U.S. application Ser. No. 17/016,776 filed on Sep. 10, 2020, which claims priority to Chinese Patent Application No. CN202010622483.4 filed on Jun. 30, 2020, and the entirety of each of which is incorporated herein by reference.

TECHNICAL FIELD

Embodiments of the present disclosure relate to the field of display technologies and, particularly, to a display device and a vehicle.

BACKGROUND

With the development of science and technology, vehicles have more and more functions, for example, the vehicles are provided with vehicle electrical appliances such as air conditioners and sound boxes. For the convenience of users controlling the vehicle electrical appliances, the vehicles are further provided with knobs.

Currently, in order to facilitate a user to control various vehicle electrical appliances through a knob, the knob is usually disposed on a vehicle display screen. When the vehicle display screen displays an air conditioner control interface, the working temperature of the air conditioner can be adjusted by rotating the knob; and when the vehicle display screen displays a sound box control interface, volume adjustment, song switching and the like can be implemented by rotating the knob. However, the knob is usually fixed on the vehicle display screen by gluing or the like, which brings inconvenience to the user.

SUMMARY

The present disclosure provides a display device and a vehicle, so as to freely take and adhere a knob on a display panel.

In a first aspect, an embodiment of the present disclosure provides a display device including a knob and a display panel; the knob includes a first magnetic adhering piece; the display device further includes a second magnetic adhering structure, and the second magnetic adhering structure is disposed on anon-light exiting side of the display panel; the second magnetic adhering structure includes a plurality of first magnetic adhering regions, and at least two first magnetic adhering regions among the plurality of first magnetic adhering regions are not overlapped; and the knob is magnetically adhered to any one of the plurality of first magnetic adhering regions, the knob is disposed on a light exiting side of the display panel.

In a second aspect, an embodiment of the present disclosure further provides a vehicle including the display device described in the first aspect.

DETAILED DESCRIPTION

Figure 1:
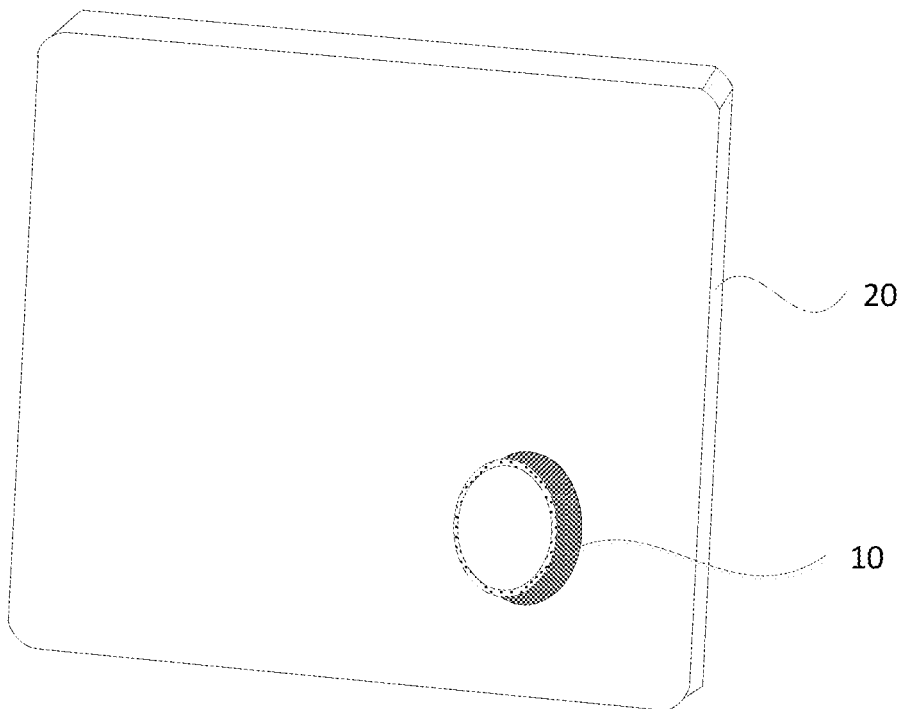
FIG. 1 is a structure diagram of a display device according to an embodiment of the present disclosure.

Hereinafter the present disclosure will be further described in detail with reference to the drawings and embodiments. It is to be understood that the specific embodiments set forth below are intended to illustrate and not to limit the present disclosure. Additionally, it is to be noted that, for ease of description, only part, not all, of the structures related to the present disclosure are illustrated in the drawings.

Embodiments of the present disclosure provide a display device including a knob and a display panel; the knob includes a first magnetic adhering piece; the display device further includes a second magnetic adhering structure, and the second magnetic adhering structure is disposed on a non-light exiting side of the display panel; the second magnetic adhering structure includes a plurality of first magnetic adhering regions, and at least two first magnetic adhering regions among the plurality of first magnetic adhering regions are not overlapped; and the knob is magnetically adhered to any one of the plurality of first magnetic adhering regions, the knob is disposed on a light exiting side of the display panel.

In view of the above, the first magnetic adhering piece is disposed in the knob, and the second magnetic adhering structure is disposed on the non-light exiting side of the display panel, so that the knob can be adhered on a light exiting side of the display panel through a magnetic force. Furthermore, the second magnetic adhering structure includes a plurality of first magnetic adhering regions, so that the knob can be adhere on any one of the plurality of first magnetic adhering regions, more optional adhering positions are provided to the user, the single setting position of the knob is avoided, and an effect of freely taking and adhering the knob is achieved.

The above is the core idea of the present application, and the embodiments of the present disclosure will be described clearly and completely in conjunction with the drawings in the embodiments of the present disclosure. Apparently, the embodiments described below are part, not all of the embodiments of the present disclosure. Based on the embodiments of the present disclosure, all other embodiments obtained by those skilled in the art are within the scope of the present disclosure on the premise that no creative work is done.

FIG. 1 is a structure diagram of a display device according to an embodiment of the present disclosure. With reference to FIG. 1, the display device includes a knob 10 and a display panel 20. The knob 10 includes a first magnetic adhering piece (not shown in FIG. 1), the display device further includes a second magnetic adhering structure (not shown in FIG. 1), and the second magnetic adhering structure is disposed on a non-light exiting side of the display panel 20; the second magnetic adhering structure includes a plurality of first magnetic adhering regions, and at least two first magnetic adhering regions are not overlapped; the knob 10 is magnetically adhered to any first magnetic adhering region, the knob 10 is disposed on a light exiting side of the display panel 20.

Specifically, the first magnetic adhering piece may be a magnet, an energized coil, or other magnets known to those skilled in this art, and is not limited thereto. The specific shape and structure of the first magnetic adhering piece can be set by those skilled in this art according to practical situations, and is not limited herein. Exemplarily, the first magnetic adhering piece can be an integral structure and can have a shape of circle, ring, rectangle, or the like. Exemplarily, the first magnetic adhering piece further includes a plurality of first magnets, the plurality of first magnets may be arranged regularly, for example, the plurality of first magnets are arranged in a straight line shape, a broken line shape, a wave shape or a ring shape; the plurality of first magnets may also be irregularly arranged.

Specifically, the knob 10 may include a first housing and a second housing, and the first housing and the second housing form an accommodation space. When the knob 10 is adhered on the display panel 20, the first housing is disposed on a side of the second housing away from the display panel 20, and the first magnetic adhering piece is disposed in the accommodation space formed by first housing and second housing, or the second housing is made of a magnetic material, for example neodymium iron boron magnet, so that the second housing can be reused as the first magnetic adhering piece, which is conductive to implementing thinning and miniaturization of the knob 10.

Specifically, the display panel 20 may be an organic light emitting display panel, a liquid crystal display panel, or other display panels known to those skilled in the art, and is not limited herein.

Specifically, the second magnetic adhering structure may be a magnet, an energized coil or other magnets known to those skilled in the art, and is not limited herein; and in an embodiment, a polarity of a magnetic pole of the first magnetic adhering piece facing toward the display panel is opposite to a polarity of a magnetic pole of the second magnetic adhering structure facing toward the display panel. The second magnetic adhering structure includes a plurality of first magnetic adhering regions, and the second magnetic adhering structure in each first magnetic adhering region can be magnetically adhered together with the first magnetic adhering piece in the knob 10 by magnetic force, so that the knob 10 is adhered on the display panel 20.

It should be noted that the knob 10 is fixed to the display panel 20 by the magnetic force, so that it is simple and convenient for the user to adhere and take the knob 10 on the display panel 20. Furthermore, by setting that the second magnetic adhering structure includes a plurality of first magnetic adhering regions, more optional adhering positions can be provided for the user, so that the user can adhere the knob 10 to a position for operating conveniently according to the practical situations, the difficulty in turning the knob 10 when the knob 10 is located at an improper position can be avoided.

It should be understood that the number of the first magnetic adhering regions and the arrangement manner of the first magnetic adhering regions are determined by the specific structure of the second magnetic adhering structure, and the specific structure of the second magnetic adhering structure can be set by those skilled in the art according to the practical situations, and the following description is given with reference to an exemplary example, but is not intended to limit the present application.

Figure 2:
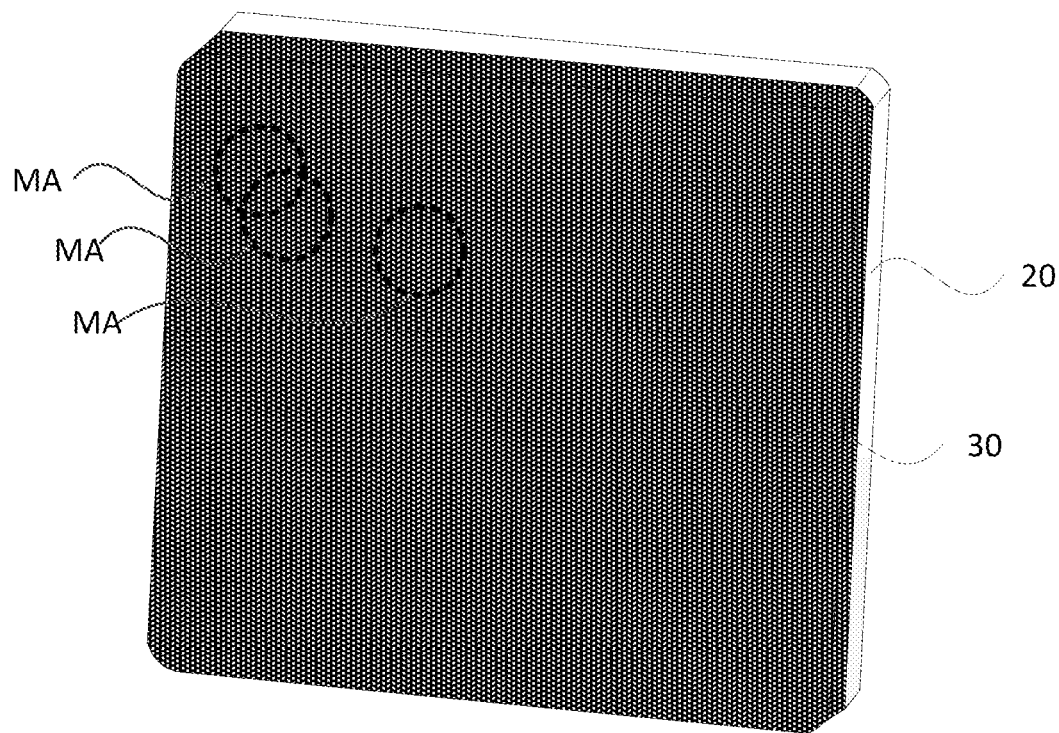
FIG. 2 is a structure diagram of a second magnetic adhering structure according to an embodiment of the present disclosure.

FIG. 2 is a structure diagram of a second magnetic adhering structure according to an embodiment of the present disclosure. Referring to FIG. 2, in an embodiment, the second magnetic adhering structure 30 and the display panel 20 have a same size. In this way, the knob 10 can be freely adhered to any position of the display panel 20, and any adhering position of the knob 10 corresponds to one first magnetic adhering region MA.

Specifically, the second magnetic adhering structure 30 is an entire surface structure. That the second magnetic adhering structure 30 and the display panel 20 have the same size refers to that an error between the second magnetic adhering structure 30 and the display panel 20 is within a preset tolerance, and a specific value of the preset tolerance can be set by a person skilled in the art according to the practical situation. The display device may further include a first housing disposed on a non-light exiting side of the display panel 20, and the second magnetic adhering structure 30 with the entire surface structure may be disposed on the first housing. The second magnetic adhering structure 30 may be an energized coil, and is fixed on the first housing by gluing. The second magnetic adhering structure 30 may also be a magnet, and is fixed on the first housing by gluing or a buckling structure on the first housing. It should be understood that, because the second magnetic adhering structure 30 is an entire surface structure, the entire second magnetic adhering structure 30 can be laid without aligning, so that the second magnetic adhering structure 30 can easily be assembled. Moreover, the requirement on precision of the size of the second magnetic adhering structure 30 is relatively low, so that precision of a preparation process of the second magnetic adhering structure 30 is low, which is conductive to reducing the difficulty in preparation of the second magnetic adhering structure 30.

It should be noted that the second magnetic adhering structure 30 shown in FIG. 2 actually includes a plurality of first magnetic adhering regions MA. However, since it is difficult to divide all of the plurality of first magnetic adhering regions MA, only three first magnetic adhering regions MA are shown exemplarily in FIG. 2.

Figure 3:
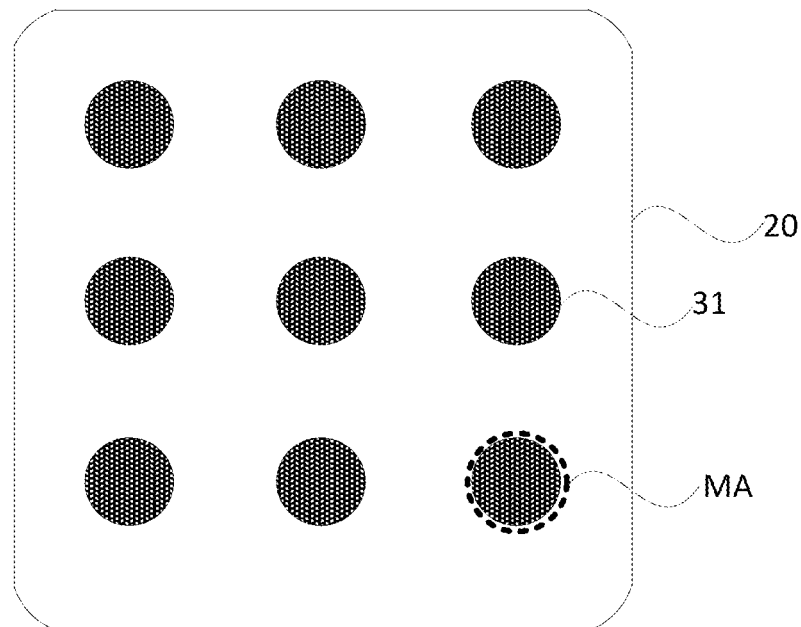
FIG. 3 is a structure diagram of another second magnetic adhering structure according to an embodiment of the present disclosure.
Figure 4:
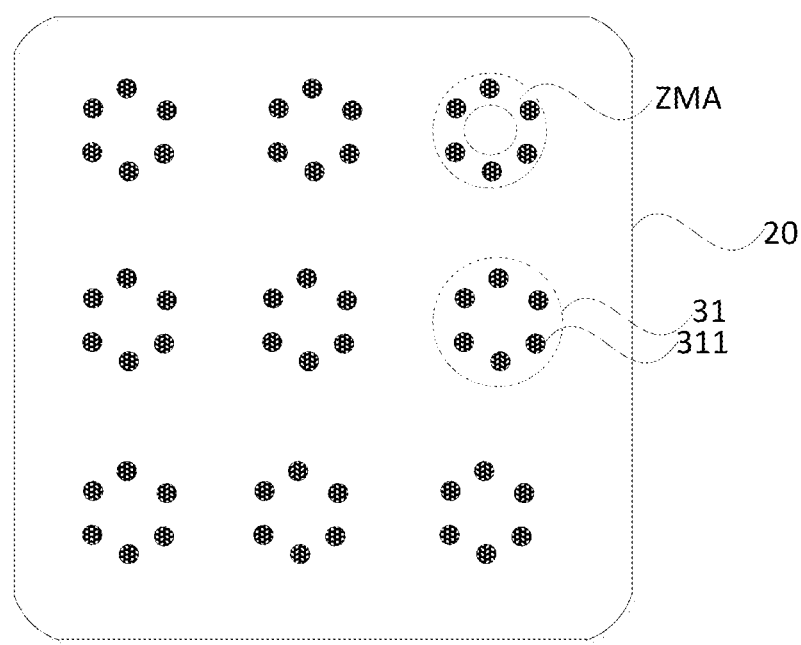
FIG. 4 is a structure diagram of still another second magnetic adhering structure according to an embodiment of the present disclosure.

FIG. 3 is a structure diagram of another second magnetic adhering structure according to an embodiment of the present disclosure. FIG. 4 is a structure diagram of still another second magnetic adhering structure according to an embodiment of the present disclosure. Referring to FIG. 3 and FIG. 4, in an embodiment, the second magnetic adhering structure 30 includes a plurality of second magnetic adhering pieces 31, and any two of the plurality of second magnetic adhering pieces 31 are disposed at different positions. Specifically, each second magnetic adhering piece 31 corresponds to a first magnetic adhering region MA. The specific shape and structure of the second magnetic adhering piece 31 can be set by those skilled in this art according to the practical situations, and is not limited herein. Exemplarily, the second magnetic adhering piece 31 can be an integral structure and can have a shape of circle (as shown in FIG. 3), ring, rectangle, or the like. Exemplarily, the second magnetic adhering piece 31 further includes a plurality of second magnets 311, the plurality of second magnets 311 may be arranged regularly, for example, the plurality of second magnets are arranged in a straight line shape, a broken line shape, a wave shape or a ring shape (as shown in FIG. 3); the plurality of second magnets 311 may also be irregularly arranged. It should be noted that FIG. 3 and FIG. 4 only exemplarily show the regular arrangement of the plurality of second magnetic adhering pieces 31, but it is not a limitation of the present application. In other embodiments, the plurality of second magnetic adhering pieces 31 may also be irregularly arranged. When the plurality of second magnetic adhering pieces 31 is regularly arranged, the plurality of second magnetic adhering pieces 31 may be arranged in a matrix (as shown in FIG. 3 and FIG. 4), a rectangular-ambulatory-plane shape, a spiral shape, a bow shape, or other manners known by those skilled in the art.

It should be understood that the second magnetic adhering structure 30 includes a plurality of second magnetic adhering pieces 31, so that those skilled in the art can flexibly set the number of the second magnetic adhering pieces 31 in the second magnetic adhering structure 30, the area of each second magnetic adhering piece 31, the arrangement manner of the plurality of second magnetic adhering pieces 31, and the distance between adjacent second magnetic adhering pieces 31. Moreover, by adjusting the number and distribution density of the second magnetic adhering pieces 31, the cost of the second magnetic adhering structure 30 can be flexibly adjusted. It should also be understood that the size of each second magnetic adhering piece 31 is relatively small, and the magnetic adhering force generated by the second magnetic adhering piece 31 is relatively small, which can prevent an external paramagnetic component of a large size from being mistakenly adhered to the display panel 20.

Figure 5:
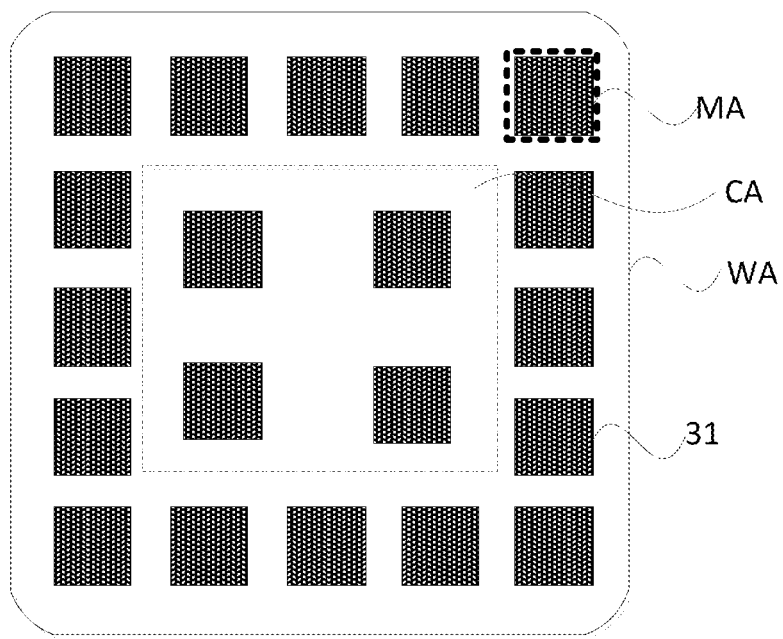
FIG. 5 is a structure diagram of yet another second magnetic adhering structure according to an embodiment of the present disclosure.

FIG. 5 is a structure diagram of yet another second magnetic adhering structure according to an embodiment of the present disclosure. Referring to FIG. 5, in an embodiment, the display panel 20 includes a central region CA and an edge region WA surrounding the central region CA, and a distribution density of second magnetic adhering pieces 31 in the central region CA is smaller than a distribution density of second magnetic adhering pieces 31 in the edge region WA; and a ratio of an area of the central region CA to an area of the edge region WA has a range from 2:1 to 3:1

It should be understood that an object currently controlled by the knob 10 usually matches a content currently displayed on the display panel 20. For example, when the display panel 20 displays a parameter setting interface of an air conditioner, the user can rotate the knob 10 to adjust parameters, such as the temperature, the running manner. Therefore, in order to prevent the knob 10 from blocking the display content of the display panel 20, the user has a greater chance of choosing to adhere the knob 10 to a corner of the display panel 20. It should be understood that the distribution density of the second magnetic adhering pieces 31 in the edge region WA is relatively large, which can make a distribution density of the first magnetic adhering regions MA in the edge region WA larger, which is convenient for the user to find and operate the knob 10 and does not affect the adhering position of the knob 10 displayed on the display panel 20.

Figure 6:
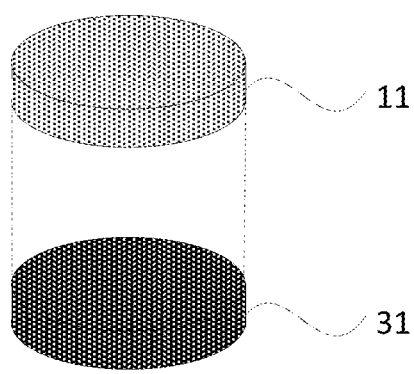
FIG. 6 is a structure diagram illustrating a first magnetic adhering piece and a second magnetic adhering piece adhered to each other according to an embodiment of the present disclosure.

FIG. 6 is a structure diagram illustrating a first magnetic adhering piece and a second magnetic adhering piece adhered to each other according to an embodiment of the present disclosure. In an embodiment, when the second magnetic adhering structure 30 includes a plurality of second magnetic adhering pieces 31, the first magnetic adhering piece 11 and the second magnetic adhering piece 31 have a same shape, and a difference between a size of the first magnetic adhering piece 11 and a size of the second magnetic adhering piece 31 is smaller than a second preset tolerance; a specific value of the second preset tolerance can be set by those skilled in the art according to the practical situations, and is not limited herein. It should be noted that, in order to clearly illustrate the first magnetic adhering piece 11 and the second adhering piece 31, the display panel 20 is not shown in FIG. 6, but actually, at least the display panel 20 is spaced between the first magnetic adhering piece 11 and the second adhering piece 31, and additionally, FIG. 6 exemplarily shows that the first magnetic adhering piece 11 and the second adhering piece 31 have a same shape and a same size.

It should be understood that when the knob 10 is adhered to the display panel 20, an orthographic projection of a first magnetic adhering piece 11 on the display panel 20 almost coincides an orthographic projection of a second magnetic adhering piece 31 (referred to as an active second magnetic adhering piece 31) adhered to the first magnetic adhering piece 11 on the display panel 20, and a magnetic force applied by the active second magnetic adhering piece 31 on the first magnetic adhering piece 11 is almost perpendicular to the display panel 20, so that the magnetic force generated by the active second magnetic adhering piece 31 is almost used for adhering the first magnetic adhering piece 11, thereby making an active utilization rate of the magnetic force generated by the active second magnetic adhering piece 31 higher.

Figure 7:
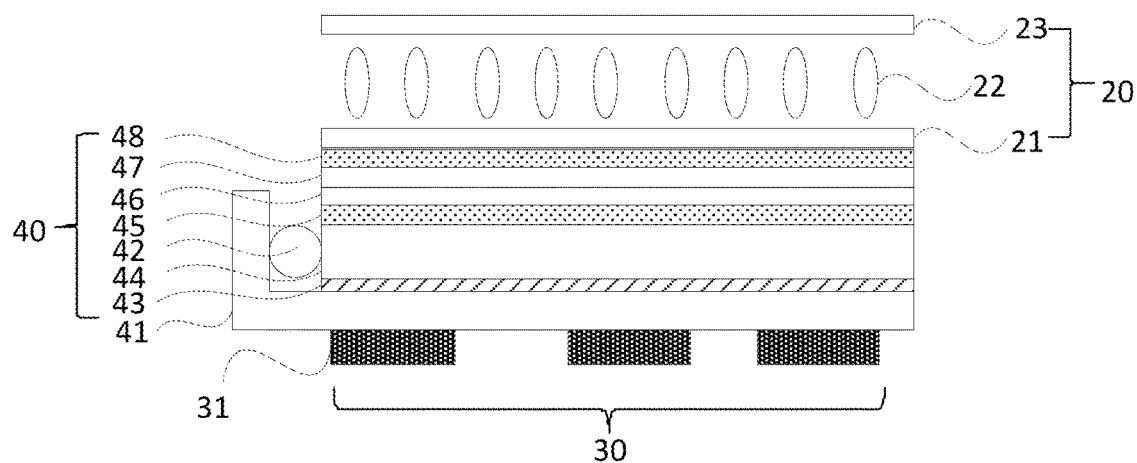
FIG. 7 is a structure diagram of another display device according to an embodiment of the present disclosure.

FIG. 7 is a structure diagram of another display device according to an embodiment of the present disclosure. Referring to FIG. 7, in an embodiment, the display panel 20 includes a liquid crystal display panel, the display device further includes a backlight module 40, and the second magnetic adhering structure 30 is disposed on a backplane 41 of the backlight module 40.

Specifically, the liquid crystal display panel includes an array substrate 21, a color filter substrate 23, and a liquid crystal layer 22 disposed between the array substrate 21 and the color filter substrate 23; the liquid crystal display panel does not emit light and needs the backlight module 40 to provide a light source. The specific structure of the backlight module 40 may be set by those skilled in the art according to the practical situations, and is not limited herein. Exemplarily, with continued reference to FIG. 7, the backlight module 40 includes a backplane 41, a light emitting element 42, and an optical film assembly; the optical film assembly includes a reflection sheet 43, a light guide plate 44, a first diffusion sheet 45, a first prism sheet 46, a second prism sheet 47, and a second diffusion sheet 48, which are stacked in turn; the light emitting element 42 is disposed on a side face of the light guide plate 44, and the backplane 41 is used for accommodating and protecting the light emitting element 42 and the optical film assembly. In an embodiment, the second magnetic adhering structure 30 may be fixedly disposed on a surface of a side of the backplane 41 away from the liquid crystal display panel by bonding, welding or other manners known to those skilled in the art. Thus, the second magnetic adhering structure 30 does not affect other devices in the backlight module 40, and at the same time, avoids blocking a light path of the display device, and ensures a high-quality light source emitted by the backlight module 40.

It can be understood that, compared with the provision of a separate substrate for carrying the second magnetic adhering structure 30, reusing the backplane 41 to carry the second magnetic adhering structure 30 is conductive to implementing lightening and thinning of the display device.

Figure 8:
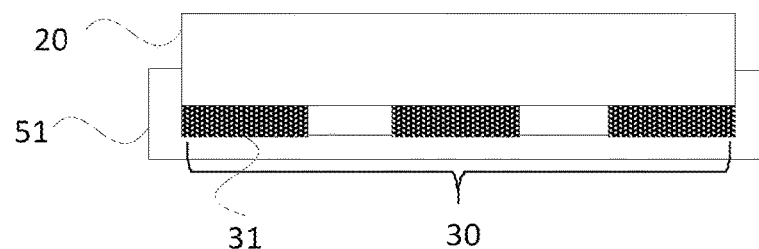
FIG. 8 is a structure diagram of still another display device according to an embodiment of the present disclosure.

FIG. 8 is a structure diagram of still another display device according to an embodiment of the present disclosure. Referring to FIG. 8, in an embodiment, the display panel 20 includes an organic light emitting display panel; the display device includes a first housing 51, the first housing 51 is disposed on a non-light exiting side of the organic light emitting display panel, and the second magnetic adhering structure 30 is disposed on the first housing 51.

In an embodiment, the second magnetic adhering structure 30 may be fixedly disposed on the first housing 51 by bonding, welding or other manners known to those skilled in the art. It can be understood that, compared with the provision of a separate substrate for carrying the second magnetic adhering structure 30, reusing the first housing 51 to carry the second magnetic adhering structure 30 is conductive to implementing the lightening and thinning of the display device.

With continued to reference to FIG. 8, in an embodiment, the second magnetic adhering structure 30 may be disposed on a surface of a side of the first housing 51 facing towards the display panel 20. Therefore, the second magnetic adhering structure 30 can be wrapped in the display device, and the adhering capability of the second magnetic adhering structure 30 to outside paramagnetic substance is reduced. In an embodiment, a support structure may be further disposed between the second magnetic adhering structure 30 and the display panel 20, and the support structure is used for supporting the display panel 20, so as to prevent the second magnetic adhering structure 30 from directly contacting the display panel 20, and prevent the second magnetic adhering structure 30 with an uneven surface from damaging the display panel. Exemplarily, the support structure may be a form gel.

In an embodiment, the second magnetic adhering structure 30 may be disposed on a surface of a side of the first housing 51 away from the display panel 20. It should be understood that, a printed circuit board is usually disposed in the display device, a magnetic element such as an inductor is usually disposed on the printed circuit board, and the second magnetic adhering structure 30 is disposed on a side of the first housing 51 away from the display panel 20, so that a distance between the second magnetic adhering structure 30 and the magnetic element can be increased, thereby reducing interference of the second magnetic adhering structure 30 on the magnetic element.

Figure 9:
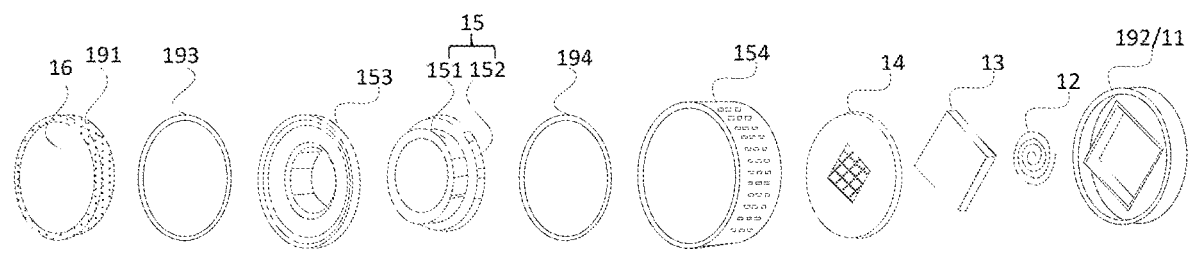
FIG. 9 is an exploded view of a knob according to an embodiment of the present disclosure.
Figure 10:
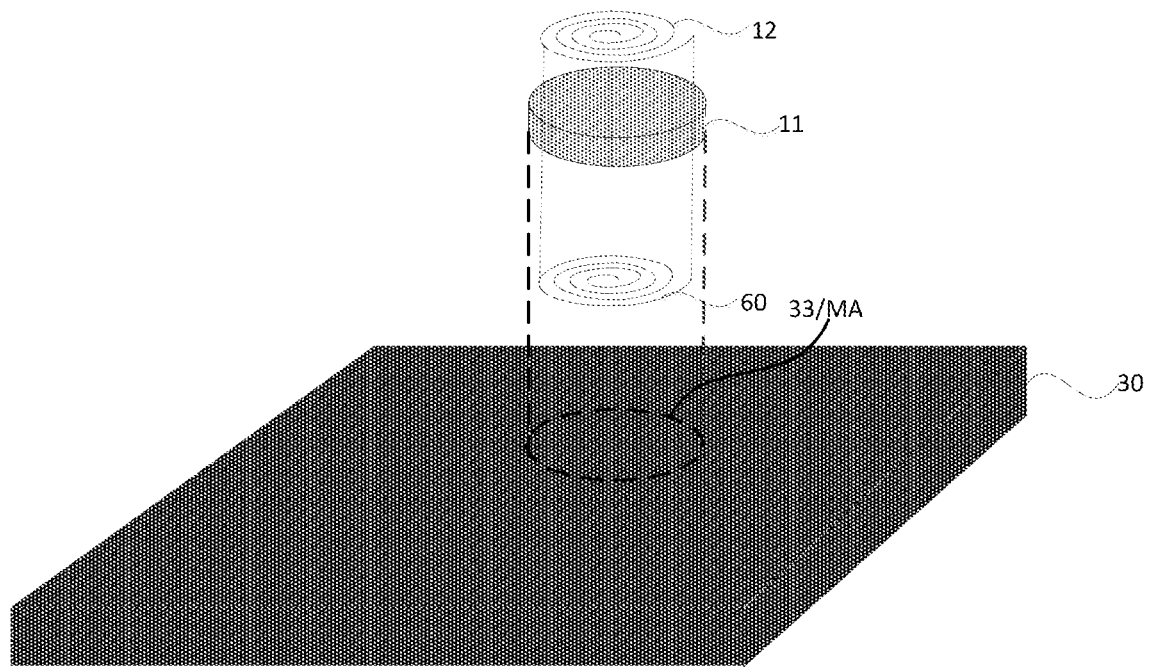
FIG. 10 is a schematic diagram illustrating a relative position relationship between a first charging coil and a second charging coil when a knob is adhered to a first charging region according to an embodiment of the present disclosure.
Figure 11:
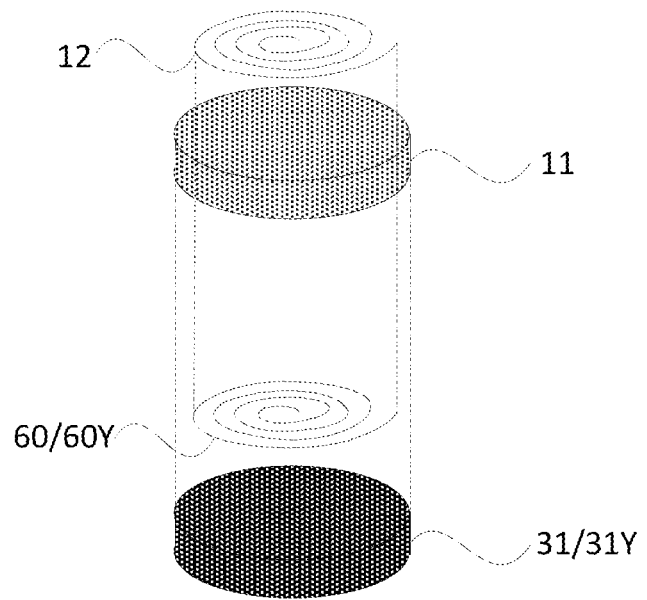
FIG. 11 is a schematic diagram illustrating another relative position relationship between a first charging coil and a second charging coil when a knob is adhered to a first charging region according to an embodiment of the present disclosure.
Figure 12:
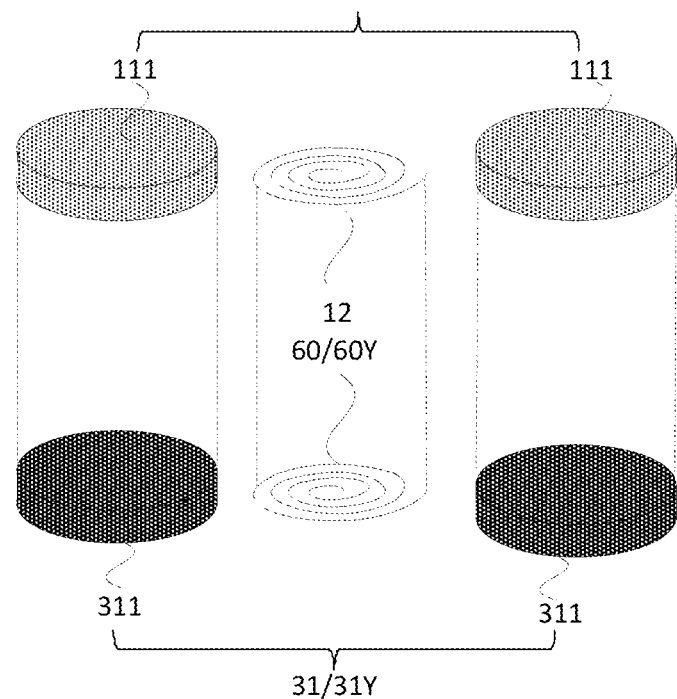
FIG. 12 is a schematic diagram illustrating still another relative position relationship between a first charging coil and a second charging coil when a knob is adhered to a first charging region according to an embodiment of the present disclosure.

FIG. 9 is an exploded view of a knob according to an embodiment of the present disclosure. FIG. 10 is a schematic diagram illustrating a relative position relationship between a first charging coil and a second charging coil when a knob is adhered to a first charging region 33 according to an embodiment of the present disclosure. FIG. 11 is a schematic diagram illustrating another relative position relationship between a first charging coil and a second charging coil when a knob is adhered to a first charging region 33 according to an embodiment of the present disclosure. FIG. 12 is a schematic diagram illustrating still another relative position relationship between a first charging coil and a second charging coil when a knob is adhered to a first charging region 33 according to an embodiment of the present disclosure. Referring to FIG. 9 to FIG. 12, in an embodiment, the knob 10 further includes a first charging coil 12 and a battery 13, and the battery is electrically connected to the first charging coil 12; the display device further includes at least one second charging coil 60; and the plurality of first magnetic adhering regions MA includes at least one first charging region 33; when the knob 10 is magnetically adhered to the first charging region 33, an orthographic projection of the first charging coil 12 on the display panel 20 at least partially overlaps an orthographic projection of the second charging coil 60 on the display panel 20.

Exemplarily, referring to FIG. 9, the knob 10 includes a first housing 191 and a second housing 192, the battery 13 and the first charging coil 12 are disposed in the accommodation space formed by the first housing 191 and the second housing 192, the second housing 192 is reused as the first magnetic adhering piece 11. When the knob 10 is adhered to the display panel 20, the second housing 192 is in contact with the display panel 20. Specifically, the exact component powered by the battery 13 in the knob 10 is not described here, and will be described in detail below.

Specifically, when the knob 10 is adhered to the first charging region 33, the second charging coil 60 can charge the battery 13 through the first charging coil 12 with following principle: when an alternating current flows in the second charging coil 60, the second charging coil 60 can generate a changing magnetic field, the first charging coil 12 is located in the changing magnetic field, and a current with a corresponding magnitude can be generated according to the changing magnetic field to charge the battery 13.

In an embodiment, with continued reference to FIG. 9, the first charging coil 12 is disposed on a surface of a side of the second housing 192 away from the display panel 20, so that, along a direction perpendicular to the display panel 20, a distance between the first charging coil 12 and the second charging coil 60 can be made as short as possible, thereby increasing charging efficiency.

With continued reference to FIG. 10 to FIG. 12, in an embodiment, when the knob 10 is magnetically adhered to the first charging region 33, an orthographic projection of the first charging coil 12 on the display panel 20 and an orthographic projection of the second charging coil 60 on the display panel 20 overlap, so that when the alternating current in the second charging coil 60 is constant, the current generated by the first charging coil 12 can be made as large as possible, thereby increasing the charging efficiency.

Referring to FIG. 11 and FIG. 12, in an embodiment, the second magnetic adhering structure 30 includes a plurality of second magnetic adhering pieces 31, and any two second magnetic adhering pieces 31 are disposed at different positions; when the knob 10 is magnetically adhered to the first charging region 33, a second magnetic adhering piece 31 to which the first magnetic adhering piece 11 is magnetically adhered is an active second magnetic adhering piece 31Y, and a second charging coil 60 for charging the battery 13 is an active second charging coil 60Y; and a relative position relationship of the active second magnetic adhering piece 31Y and the active second charging coil 60Y is the same as a relative position relationship of the first magnetic adhering piece 11 and the first charging coil 12.

The relative position relationships being the same refers to that, when the knob 10 is magnetically adhered to the first charging region, the orthographic projection of the first magnetic adhering piece 11 on the display panel 20 and the orthographic projection of the active second magnetic adhering piece 31Y on the display panel 20 coincide, and at the same time, the orthographic projection of the first charging coil 12 on the display panel 20 and the orthographic projection of the second charging coil 60 on the display panel 20 coincide. This ensures that the knob 10 is located in the first charging region 33 when the knob 10 is adhered, thereby implementing the efficient charging.

It should be understood that the number and distribution of the first charging regions 33 are related to the number and distribution (distribution in a horizontal plane parallel to the display panel 20) of the second charging coils 60, and may be set by those skilled in the art according to practical situations, and is not limited herein.

In an embodiment, when the distance between two adjacent first charging regions 33 is greater than the first preset distance, the first charging regions 33 correspond to the second charging coils 60 one by one, as shown in FIG. 11 and FIG. 12. In this way, the conditions that the positional relationship between the first charging regions 33 and the second charging coils 60 corresponding thereto needs to satisfy is relatively loose, the arrangement manner of the positional relationship between them is diversified, and those skilled in the art can arrange the first charging regions 33 and the second charging coils 60 corresponding thereto at suitable positions according to the practical situations. It should be noted that, the specific value of the first preset distance may be set by those skilled in the art according to practical situations, and is not limited herein.

Figure 13:
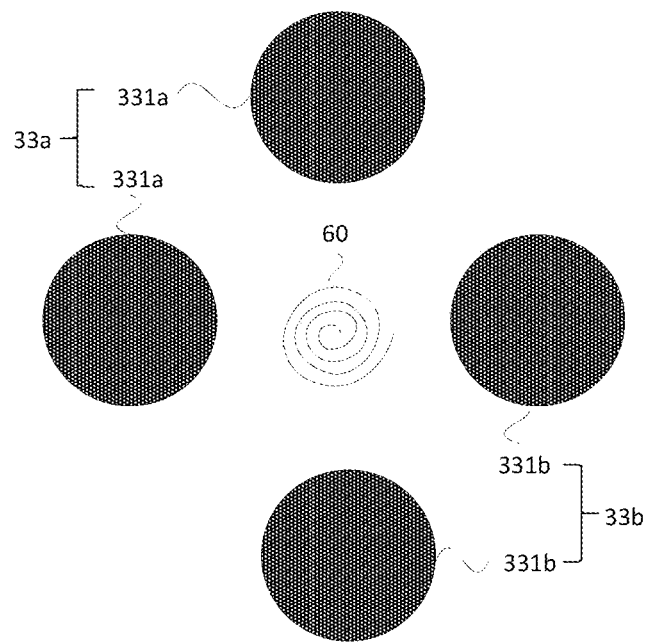
FIG. 13 is a structure diagram of a second charging coil shared by two first charging regions according to an embodiment of the present disclosure.

In an embodiment, when the distance between two adjacent first charging regions 33 is smaller than the second preset distance, at least two first charging regions 33 share one second charging coil 60. Exemplarily, FIG. 13 is a structure diagram of a second charging coil shared by two first charging regions according to an embodiment of the present disclosure. Referring to FIG. 13, the first charging region 33a includes two first sub-charging regions 331a. When the first magnetic adhering piece 12 in the knob 10 is adhered to the first charging region 33a, the second charging coil 60 can charge the battery 13 through the first charging coil 14. At the same time, the first charging region 33b includes two first sub-charging regions 331b. When the first magnetic adhering piece 12 in the knob 10 is adhered to the first charging region 33b, the second charging coil 60 can charge the battery 13 through the first charging coil 14 as well. It should be understood that when at least two first charging regions 33 share one second charging coil 60, more first charging regions 33 can be obtained by providing less second charging coils 60, that is, more optional first charging regions 33 are provided with less cost. It should be noted that, the specific value of the second preset distance may be set by those skilled in the art according to practical situations, and is not limited herein.

Specifically, along the direction perpendicular to the display panel 20, there are many specific locations for disposing the second charging coil 60. According to whether the second charging coil 60 is integrated in the display panel 20, the second charging coil 60 can be divided into two types. Typical examples are described below, but are not limited to the present application.

In a first type, the second charging coil 60 is integrated in the display panel 20.

Figure 14:
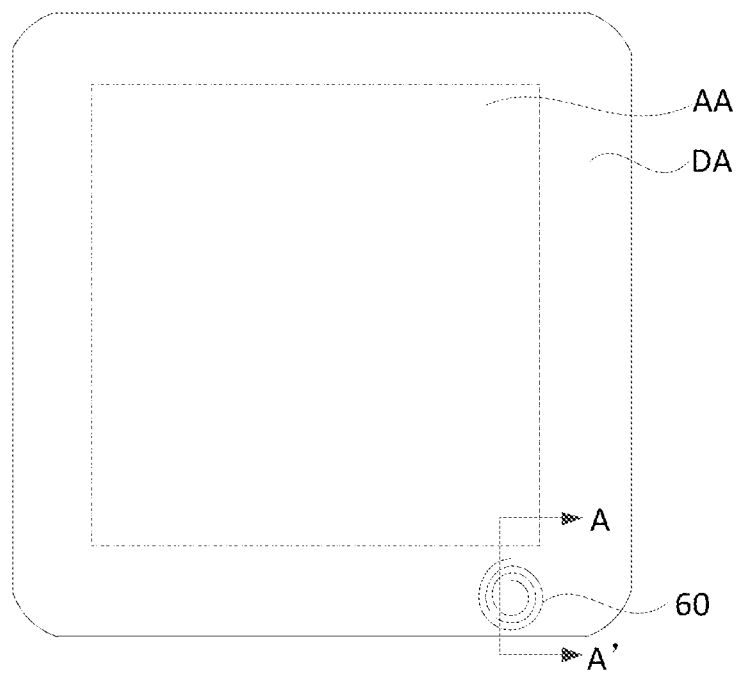
FIG. 14 is a structure diagram of a display panel according to an embodiment of the present disclosure.
Figure 15:
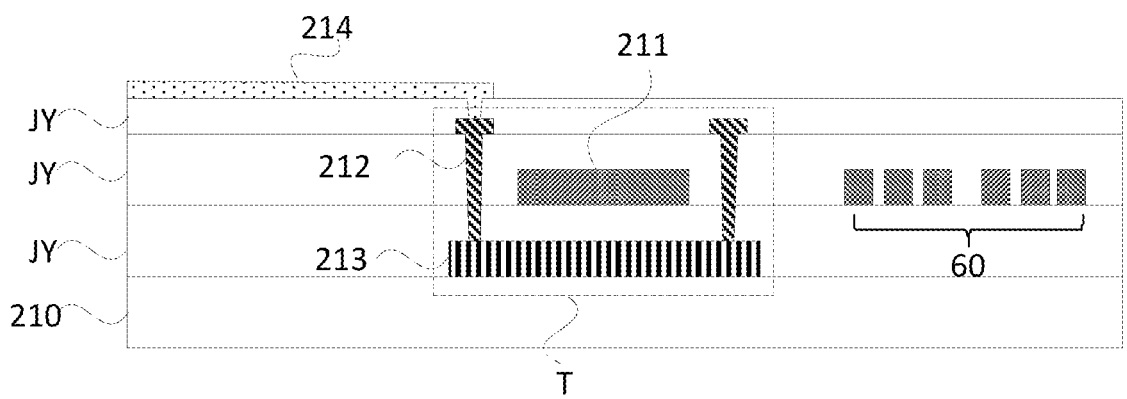
FIG. 15 is a cross-sectional view taken along a line AA' in FIG. 13.

FIG. 14 is a structure diagram of a display panel according to an embodiment of the present disclosure. FIG. 15 is a cross-sectional view taken along a line AA' in FIG. 13. Referring to FIG. 14 and FIG. 15, in an embodiment, the display panel 20 includes a substrate 20 and a plurality of metal layers 210 disposed on the substrate 20; an insulating layer JY is disposed between adjacent metal layers for insulation; and the second charging coil 60 is disposed in a same layer as one of the plurality of metal layers.

Exemplarily, with continued reference to FIG. 15, the display panel 20 includes a plurality of thin film transistors T, the plurality of metal layers include a gate metal layer 211 and a source-drain metal layer 212, and a gate electrode of the thin film transistor T is disposed in a gate metal layer 211, a source electrode and a drain electrode of the thin film transistor T are disposed in a source-drain metal layer 212. Specifically, the second charging coil 60 may be disposed in a same layer as the gate metal layer 211, as shown in FIG. 11; the second charging coil 60 may also be disposed in a same layer as the source-drain metal layer 212. Here, disposing in a same layer refers to forming in a same preparation process.

It should be understood that by forming the second charging coil 60 and one of the plurality of metal layers in the same preparation process, a step of separately preparing the second charging coil 60 can be omitted, which is conducive to reducing cost. Moreover, the second charging coil 60 is integrated into the display panel 20, a process step of fixing the second charging coil 60 can be omitted, and the assembly efficiency of the display device is increased.

Figure 16:
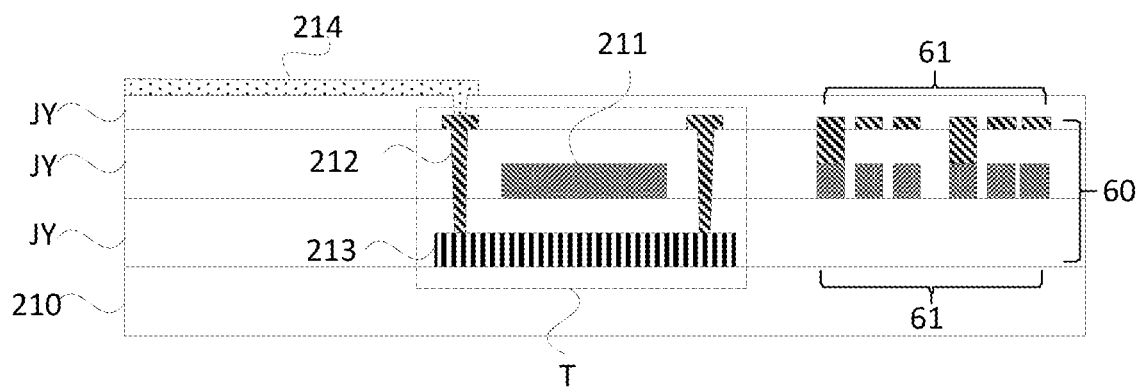
FIG. 16 is another cross-sectional view taken along a line AA' in FIG. 13.
Figure 17:
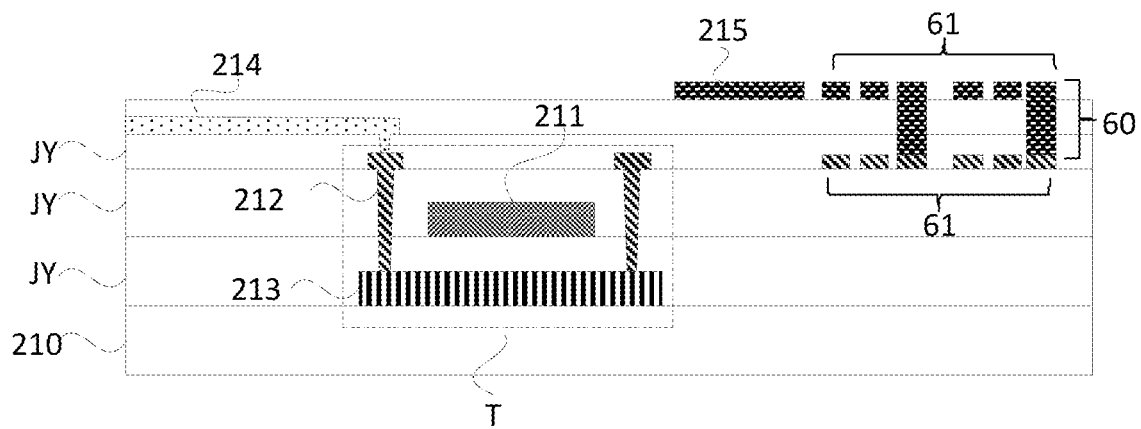
FIG. 17 is still another cross-sectional view taken along a line AA' in FIG. 13.
Figure 18:
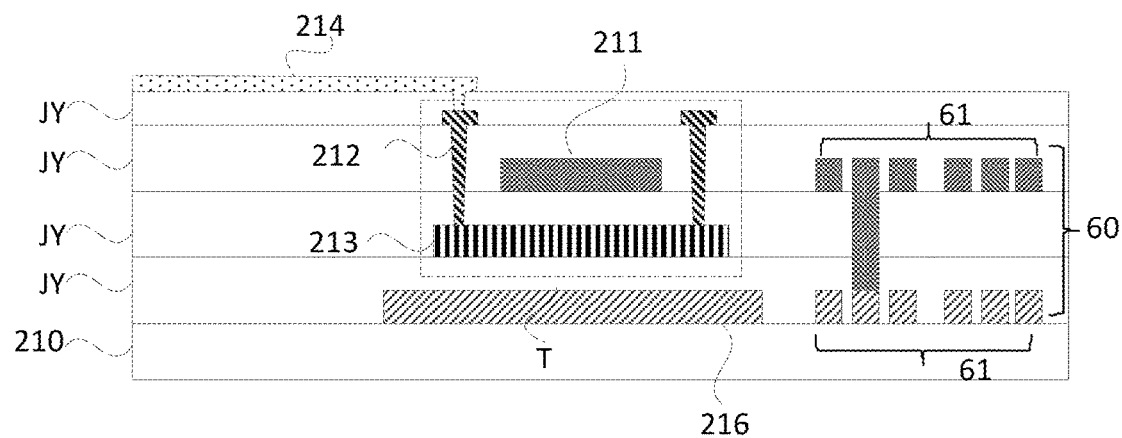
FIG. 18 is yet another cross-sectional view taken along a line AA' in FIG. 10.

FIG. 16 is another cross-sectional view taken along a line AA' in FIG. 13. FIG. 17 is still another cross-sectional view taken along a line AA' in FIG. 10. FIG. 18 is yet another cross-sectional view taken along a line AA' in FIG. 10. Referring to FIG. 16 and FIG. 17, in an embodiment, the display panel 20 includes a substrate 210 and a plurality of metal layers disposed on the substrate 210, and an insulating layer JY is disposed between adjacent metal layers for insulation; the second charging coil 60 includes at least two coil subsections 61, and two adjacent coil subsections 61 are in contact and electrically connected along a direction perpendicular to the substrate 210; the coil subsections 61 are disposed in different layers, and each coil subsection 61 is disposed in a same layer as one of the plurality of metal layers.

Specifically, the plurality of metal layers may include at least two of a gate metal layer 211, a source-drain metal layer 212, a touch electrode layer 215, and a light shielding metal layer 216. The exact layer of the plurality of metal layers, with which each coil subsection 61 is disposed in a same layer, is set by those skilled in the art according to the practical situations, and is not limited here.

Exemplarily, with continued reference to FIG. 16, the display panel 20 includes a plurality of thin film transistors T, the plurality of metal layers include a gate metal layer 211 and a source-drain metal layer 212, and a gate electrode of the thin film transistor T is disposed on the gate metal layer 211, a source electrode and a drain electrode of the thin film transistor T are disposed in a source-drain metal layer 212. Specifically, the second charging coil 60 may include two coil subsections 61 which are electrically connected to each other. One coil subsection 61 is disposed in a same layer as the gate metal layer 211, and the other coil subsection 61 is disposed in a same layer as the source-drain metal layer 212.

Exemplarily, with continued reference to FIG. 17, the display panel 20 includes a plurality of thin film transistors T and a plurality of touch electrodes. The touch electrode is provided with a hollow structure. An orthographic projection of the hollow structure on the substrate and an orthographic projection of a sub-pixel on the substrate overlap. The plurality of metal layers includes a gate metal layer 211, a source-drain metal layer 212, and a touch metal layer 215. The gate electrode of the thin film transistor T is disposed in the gate metal layer 211, and the source electrode and the drain electrode of the thin film transistor T are disposed in the source-drain metal layer 212 and the touch electrode is disposed in the touch metal layer 215. Specifically, the second charging coil 60 may include two coil subsections 61 which are electrically connected to each other. One coil subsection 61 is disposed in the same layer as the source-drain metal layer 212, and the other coil subsection 61 is disposed in the same layer as the touch metal layer 215, as shown in FIG. 16; or, one coil subsection 61 is disposed in the same layer as the gate metal layer 211, and the other coil subsection 61 is disposed in the same layer as the touch metal layer 215; or, one coil subsection 61 is disposed in a same layer as the gate metal layer 211, and the other coil subsection 61 is disposed in the same layer as the source-drain metal layer 212. The second charging coil 60 may also include three coil subsections 61 which are electrically connected to each other. The first coil subsection 61 is disposed in the same layer as the gate metal layer 211, the second coil subsection 61 is disposed in the same layer as the source-drain metal layer 212, and the third coil subsection 61 is disposed in the same layer as the touch metal layer 215.

Exemplarily, with continued reference to FIG. 18, the display panel 20 includes a plurality of thin film transistors T. The plurality of metal layers includes a gate metal layer 211, a source-drain metal layer 212 and a light shielding metal layer 216. The gate electrode of the thin film transistor T is disposed in the electrode metal layer 211, the source electrode and the drain electrode of the thin film transistor T are disposed in the source-drain metal layer 212, and the orthographic projection of the thin film transistor T on the substrate 210 falls within the orthographic projection of the light shielding metal layer 216 on the substrate 210. Specifically, the second charging coil 60 may include two coil subsections 61 which are electrically connected to each other. One coil subsection 61 is disposed in the same layer as the gate metal layer 211, and the other coil subsection 61 is disposed in the same layer as the light shielding metal layer 216, as shown in FIG. 18; or, one coil subsection 61 is disposed in the same layer as the gate metal layer 211, and the other coil subsection 61 is disposed in the same layer as the source-drain metal layer 212; or, one coil subsection 61 is disposed in the same layer as the source-drain metal layer 212, and the other coil subsection 61 is disposed in the same layer as the light shielding metal layer 216. The second charging coil 60 may also include three coil subsections 61 which are electrically connected to each other. The first coil subsection 61 is disposed in the same layer as the gate metal layer 211, the second coil subsection 61 is disposed in the same layer as the source-drain metal layer 212, and the third coil subsection 61 is disposed in the same layer as the light shielding metal layer 216.

It should be understood that the light shielding metal layer 216 is used for preventing external light from irradiating the thin film transistor T. In order to implement the light shielding effect, a metal material with low light transmissivity can be selected. In other words, the resistivity of the light shielding metal layer 216 does not affect the shading effect, therefore, in order to reduce the resistance of the second charging coil 60, those skilled in the art can select a metal material with good shading and low resistivity.

It should also be understood that the setting that the second charging coil 60 is composed of a plurality of coil subsections 61 can increase the cross-sectional area of the second charging coil 60, which is conductive to reducing the resistance of the second charging coil 60, thereby increasing charging efficiency of the battery 13. Each coil subsection 61 and one of the plurality of metal layers are formed by the same preparation process, thereby the step of separately preparing the second charging coil 60 can be omitted, and the cost is reduced. Moreover, the second charging coil 60 is integrated into the display panel 20, a process step of fixing the second charging coil 60 is omitted, and the assembly efficiency of the display device is increased.

It should be noted that FIG. 15 to FIG. 18 only exemplarily show the substrate 211, the gate metal layer 211, the source-drain metal layer 212, a channel layer 211, a pixel electrode layer 214, and the insulating layer JY; FIG. 16 further exemplarily shows the touch metal layer 215, and FIG. 18 further exemplarily shows the light shielding metal layer 216, but the display panel 20 is not limited to the above-mentioned film layer, and may also include other layers known to those skilled in the art, and is not limited in the present application.

It should also be noted that FIG. 14 to FIG. 16 only exemplarily show that the second charging coil 60 is disposed in a non-display region DA of the display panel 20, but this is not a limitation of the present application. In other embodiments, the second charging 60 may also be disposed in a display region AA of the display panel 20.

In a second type, the second charging coil 60 is not integrated in the display panel 20.

Figure 19:
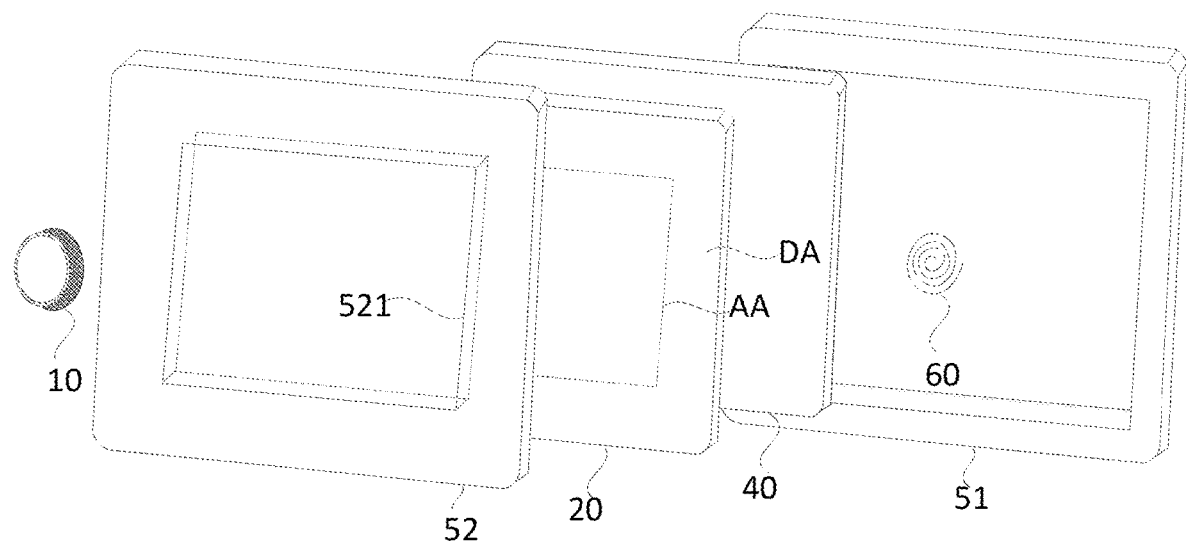
FIG. 19 is an exploded view of a display device according to an embodiment of the present disclosure.

FIG. 19 is an exploded view of a display device according to an embodiment of the present disclosure. Referring to FIG. 19, in an embodiment, the second charging coil 60 is disposed on a non-light exiting side of the display panel 20.

Specifically, the display panel 20 may include a liquid crystal display panel, the display device further includes a backlight module 40, the backlight module 40 includes a backplane, the second charging coil 60 may be disposed on one side of the backplane away from the display panel of the liquid crystal display 22, and at this time, the second charging coil 60 may be disposed in the display region AA or the non-display region DA. The liquid crystal display panel may further include a substrate for protecting and supporting film layers (e.g., a gate metal layer and a source-drain metal layer) formed thereon, and the second charging coil 60 is disposed at a surface of the substrate facing towards a non-light-exiting side. At this time, in order to prevent the second charging coil 60 from blocking the light exited from the backlight module 40, the second charging coil 60 may be disposed in the non-display region DA.

Specifically, the display panel 20 may further include an organic light emitting display panel, the organic light emitting display panel may further include a substrate, and the second charging coil 60 is disposed on a surface of the substrate facing towards the non-light exiting side, at this time, the second charging coil 60 may be disposed in the display region AA or the non-display region DA.

It should be understood that the second charging coil 60 is disposed on the surface of the substrate facing towards the non-light exiting side, so that the distance between the first charging coil 12 and the second charging coil 60 along the direction perpendicular to the display panel 20 can be made as short as possible, thereby increasing the charging efficiency.

Specifically, the display device further includes a first housing 51 and a second housing 52, the second housing 52 is provided with an opening 521, and a deviation between an orthographic projection of the opening 521 on the display panel 20 and the display region is smaller than a first preset tolerance; the first housing 51 is disposed on a non-light exiting side of the display panel 20, and the second housing 52 is disposed on a light exiting side of the display panel 20; the second charging coil may be disposed on the first housing 51. At this time, the second charging coil 60 may be disposed in the display region AA or the non-display region DA.

It can be understood that, the second charging coil 60 is disposed on the first housing 51, even if the display device further includes the backlight module 40, the second charging coil 60 does not affect other components in the backlight module 40, and at the same time, the blocking of the light path of the display device is avoided, so as to ensure the high-quality light source exited by the backlight module 40.

Figure 20:
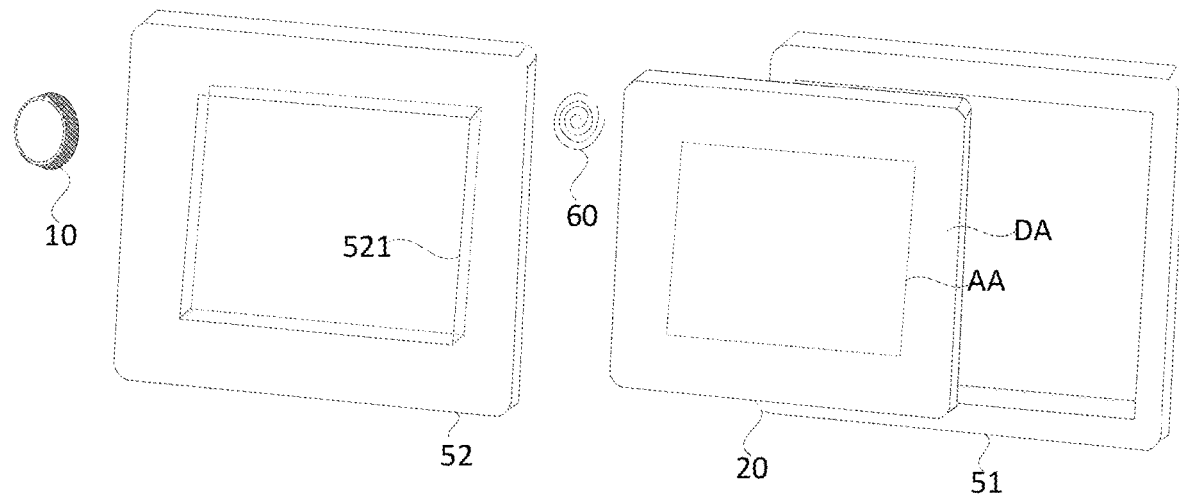
FIG. 20 is an exploded view of another display device according to an embodiment of the present disclosure.

FIG. 20 is an exploded view of another display device according to an embodiment of the present disclosure. Referring to FIG. 20, in an embodiment, the display panel 20 includes a display region AA and a non-display region DA surrounding the display region AA, the second charging coil 60 is disposed in the non-display region DA, and the second charging coil 60 is disposed on a light exiting side of the display panel 20.

Specifically, the display panel 20 includes a cover plate and a substrate disposed opposite to each other, the substrate is used for protecting and supporting film layers formed thereon, the cover plate is used for protecting the film layers between the cover plate and the substrate from water and oxygen, and the second charging coil 60 may be disposed on the cover plate. Thus, the distance between the first charging coil 12 and the second charging coil 60 can be further reduced, thereby further increasing the charging efficiency.

Specifically, the display device further includes a first housing 51 and a second housing 52, the second housing 52 is provided with the opening 521, and a deviation between an orthographic projection of the opening 521 on the display panel 20 and the display region is smaller than a first preset tolerance; the first housing 51 is disposed on the non-light exiting side of the display panel 20, and the second housing 52 is disposed on the light exiting side of the display panel 20; the second charging coil can be disposed on the second housing 52. At this time, the second charging coil 60 may be disposed in the non-display region DA.

It should be understood that: the second charging coil 60 is disposed on the second housing 52, so that the distance between the first charging coil 12 and the second charging coil 60 can be further reduced, thereby increasing the charging efficiency.

Specifically, in order to facilitate the user to identify the specific position of the first charging region, the display device may be provided with an alignment mark, and various specific implementation forms and setting positions of the alignment mark are provided, and a typical example will be described below.

Figure 21:
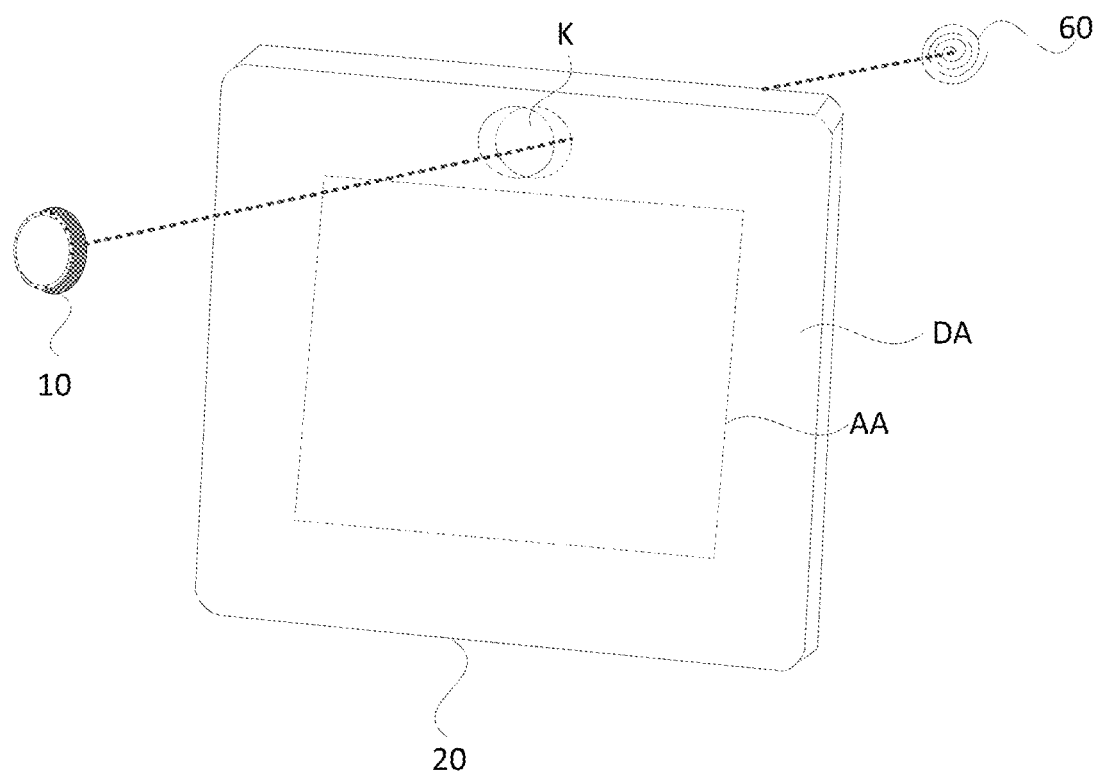
FIG. 21 is an exploded view of still another display device according to an embodiment of the present disclosure.

FIG. 21 is an exploded view of still another display device according to an embodiment of the present disclosure. Referring to FIG. 21, in an embodiment, the display panel 20 is provided with a hole structure K, a functional module is disposed in the hole structure K, and an orthographic projection of the first charging region on the display panel 20 at least partially overlaps the hole structure K.

Specifically, the hole structure K described herein is not a pixel electrode via or an insulating layer via, but a small hole visible to the human eye and used for accommodating a functional module. Specifically, the hole structure K may be a blind hole or a through hole, and is not limited herein. A cross-sectional shape of the hole structure K may be rectangular, circular, or other shapes known to those skilled in the art, and is not limited herein. The functional module can be an image acquisition module, a sound acquisition module, an infrared detection module, a fingerprint recognition module, a headphone module, or other modules known by those skilled in the art, and is not limited herein.

Specifically, along the direction perpendicular to the display panel 20, the specific setting position of the second charging coil 60 corresponding to the first charging region is not limited herein, as long as the normal operation of the functional module in the hole structure K is not affected.

It can be understood that by setting that the orthographic projection of the first charging region on the display panel 20 at least partially overlap the hole structure K, the hole structure K can be a mark indicating the position of the first charging region, and the process step of separately making the mark can be omitted. In an embodiment, the orthographic projection of the first charging region on the display panel 20 overlaps the hole structure K; and when the knob 10 is adhered on the first charging region, the orthographic projection of the first charging coil 12 on the display panel 20 overlaps the orthographic projection of the second charging coil 60 on the display panel 20, so that the user can adhere the knob 10 accurately on a region with the highest charging efficiency. When used, the knob can be placed by the user at a proper position according to needs; and when not used, the knob can be placed in the hole structure K to be charged.

Figure 22:
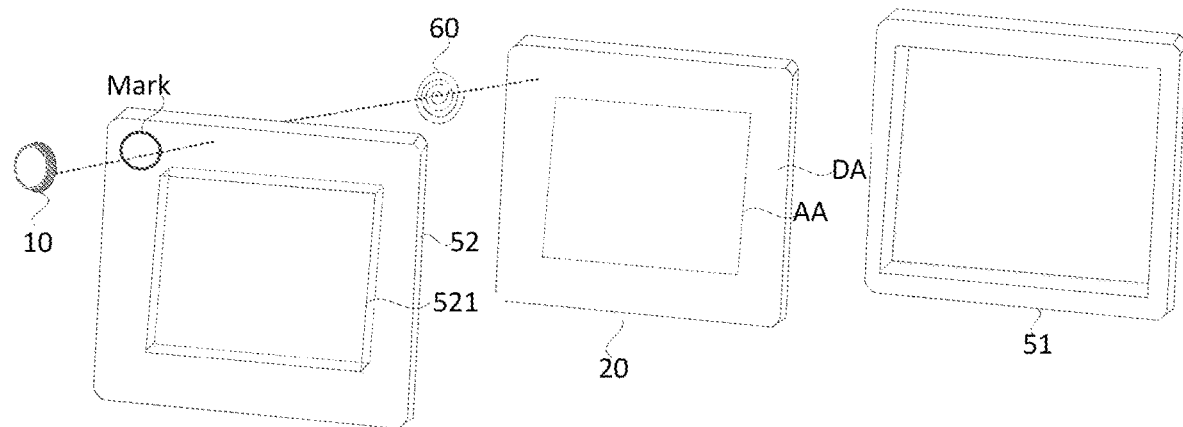
FIG. 22 is an exploded view of yet another display device according to an embodiment of the present disclosure.

FIG. 22 is an exploded view of yet another display device according to an embodiment of the present disclosure. Referring to FIG. 22, in an embodiment, the display panel 20 includes a display region AA and a non-display region DA surrounding the display region AA, and the first charging region is disposed in the non-display region DA; the display device further includes a first housing 51 and a second housing 52, the second housing 52 is provided with an opening 521, and a deviation between an orthographic projection of the opening 521 on the display panel 20 and the display region AA is smaller than a first preset tolerance; the first housing is disposed on a non-light exiting side of the display panel 20, and the second housing 52 is disposed on a light exiting side of the display panel 20; and an alignment mark Mark is provided at a position on the second housing 52 corresponding to the first charging region.

Specifically, the specific value of the first preset tolerance can be determined by those skilled in the art according to practical situations, and is not limited herein. The specific disposing position of the second charging coil 60 corresponding to the first charging region along the direction perpendicular to the display panel 20 is not limited herein.

It should be understood that, by separately providing the alignment mark Mark on the second housing 52, a specific position and a specific shape of the alignment mark Mark can be flexibly set, thereby facilitating diversification of the alignment mark Mark; moreover, the orthographic projection of the alignment mark Mark on the display panel 20 can overlap the orthographic projection of the first charging region on the display panel 20.

Figure 23:
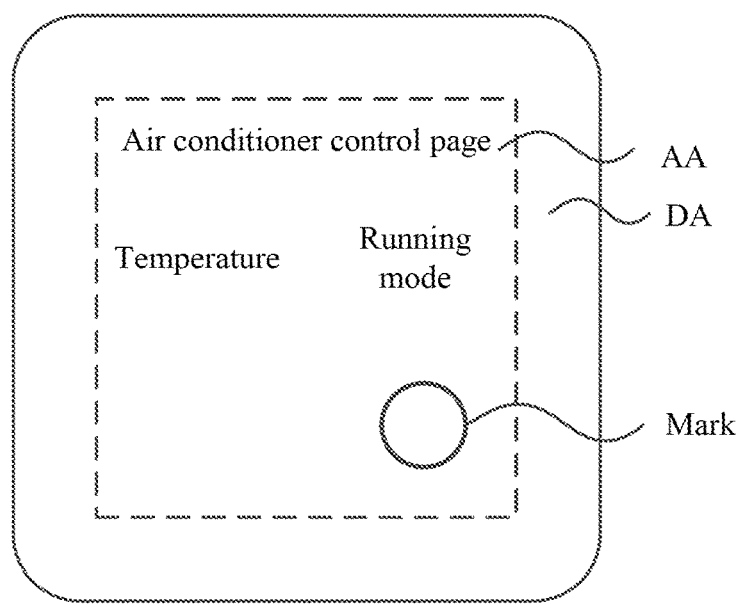
FIG. 23 is a schematic diagram of a display interface of a display panel according to an embodiment of the present disclosure.

FIG. 23 is a schematic diagram of a display interface of a display panel according to an embodiment of the present disclosure. In an embodiment, the display panel includes a display region AA and a non-display region DA surrounding the display region AA, and the first charging region is disposed in the display region AA; when the display panel 20 displays a control page, the display panel 20 displays an alignment mark Mark at a position corresponding to the first charging region.

Specifically, the layout design of the control page may be set by those skilled in the art according to the practical situations, and is not limited herein, as long as the alignment mark Mark does not block other display contents in the control page.

It should be understood that the display region AA displays the alignment mark Mark, so that a step of forming the alignment mark Mark having a solid structure may be omitted, which is conductive to reducing cost, and it is not needed to reserve a space in the non-display region DA for disposing the alignment mark Mark having a solid structure, which is conductive to increasing a screen-to-body ratio. For example, the display panel displays words of "first charging region" at the alignment mark Mark, thereby reminding the user at which position to charge.

Figure 24:
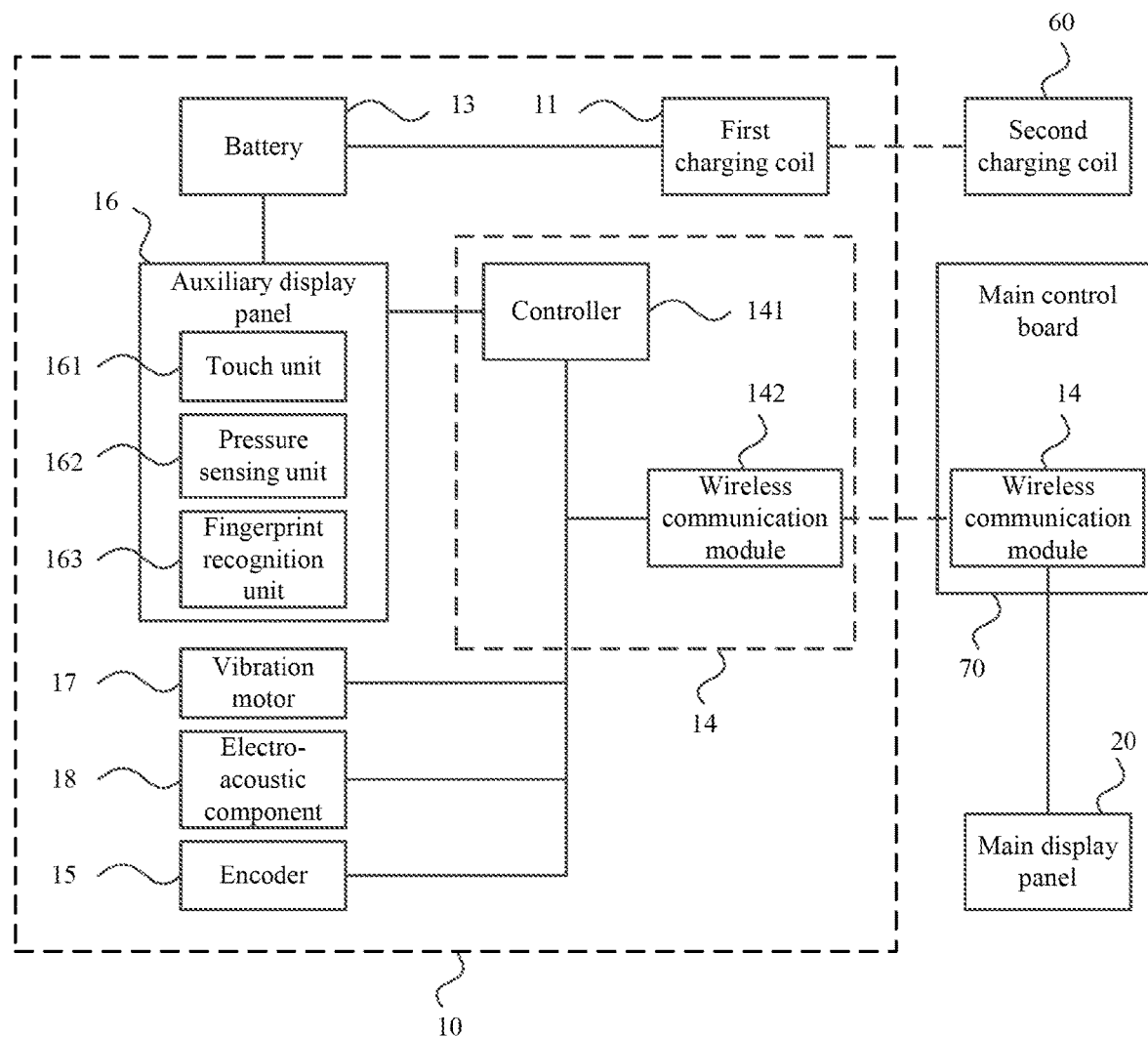
FIG. 24 is a block diagram of a display device according to an embodiment of the present disclosure.

FIG. 24 is a block diagram of a display device according to an embodiment of the present disclosure. Referring to FIG. 9 and FIG. 24, in an embodiment, the knob 10 further includes a first circuit board 14. The display device further includes a main control board 70; and each of the first circuit board 14 and the main control board 70 is provided with a wireless communication module 142.

Specifically, the first circuit board 14 is powered by the battery 13. Exemplarily, the first circuit board 14 includes a controller 141, and the wireless communication module 142 is electrically connected to the controller 141 and controlled by the controller 141; and in an embodiment, the wireless communication module 142 includes a bluetooth module, a Zigbee module, a Wi-Fi module, or other wireless communication modules known to those skilled in the art, and is not limited herein. It can be understood that, compared with the knob 10 and the main control board 70 communicating through the signal line, the knob 10 and the main control board 70 communicate wirelessly to enable the knob 10 to be free from the constraint of the signal line and to be freely adhered to any first magnetic adhering region MA.

With continued reference to FIG. 9 and FIG. 24, in an embodiment, the knob 10 further includes an encoder 15, the encoder 15 is electrically connected to the first circuit board 14, and the encoder 15 is used for sending a rotation signal to the main control board 70 through the wireless communication module 142.

Exemplarily, the knob 10 may further include a rotational structure 154 and a fixed structure 153, the encoder 15 includes an inner ring 151 and an outer ring 152, the inner ring 151 is rotatably connected to the outer ring 152, the inner ring 151 is fixedly connected to the fixed structure 153 by a buckle, the outer ring 152 is fixedly connected to the outer ring 152 by a buckle; when the rotational structure 154 is rotated, the outer ring 152 is driven to rotate relative to the inner ring 151. The encoder 15 may generate a rotation signal according to the rotation angle of the outer ring 152, and transmit the rotation signal to the controller 141 on the first circuit board 14; the controller 141 sends the rotation signal to the main control board 70 through the wireless communication module 142; the main control board 70 may obtain a control instruction according to the rotation signal, a control page currently displayed on the display panel 20, and a parameter setting type, and control a corresponding component according to the control instruction. Exemplarily, the rotation angle is 45°, the control page currently displayed on the display panel 20 is an air conditioner control page, the parameter setting type selected by the user is temperature, the control instruction obtained by the main control board 70 is cooling temperature of 26° C., and then the main control board 70 adjusts the air conditioner to 26° C.

With continued reference to FIG. 9 and FIG. 24, in an embodiment, the knob 10 further includes an auxiliary display panel 16, and the auxiliary display panel 16 is electrically connected to the first circuit board 14; the auxiliary display panel 16 is used for displaying image information sent by the main control panel 70 through the wireless communication module 142.

Specifically, the knob 10 further includes an adhesive rubber ring 193, the auxiliary display panel 16 is disposed on the first housing 191, and the adhesive rubber ring 193 adheres the first housing 191 to the fixed structure 152 so as to complete the assembly of the first housing 191 and the fixed structure 152. The main control board 70 transmits the image information to the wireless communication module 142 on the first circuit board 14 through the wireless communication module 142 on the main control board 70, and the controller 141 on the first circuit board 14 drives the auxiliary display panel 16 to display a corresponding image according to the image information. In an embodiment, the main control board 70 may generate the image information according to the control instruction, so as to enable the auxiliary display panel 16 to display the content of the control instruction; exemplarily, the control instruction is the cooling temperature of 26° C., the auxiliary display panel 16 may be controlled to display words "26° C."

With continued reference to FIG. 9 and FIG. 24, in an embodiment, the auxiliary display panel 16 includes a touch unit 161, a pressure sensing unit 162, and/or a fingerprint recognition unit 163.

Specifically, the touch unit 161 may be a self-capacitance type, a mutual-capacitance type, or other types known to those skilled in the art, and is not limited herein. The touch unit 161 includes a plurality of touch electrodes, which may be in a shape of a block, a bar, a grid, or other shapes known to those skilled in the art, and is not limited herein. The touch unit 161 is used for detecting a touch position.

Specifically, the pressure sensing unit 162 senses pressure applied to a touch pad by placing four pressure sensors at four corners of a lower side of the touch pad, and provides a specific pressure value to the controller 141 so as to react differently with different pressure values. Exemplarily, the controller 141 may transmit the pressure value to the main control board 70 through the wireless communication module 142, and the main control board 70 may obtain the control instruction according to the pressure value, the control page currently displayed on the display panel 20, and the parameter setting type, and control the corresponding component according to the control instruction.

Specifically, the fingerprint recognition unit 163 may be an optical fingerprint recognition unit, a capacitive fingerprint recognition unit, a radio frequency fingerprint recognition unit, or other types of fingerprint recognition units known to those skilled in the art, and is not limited herein. The fingerprint recognition unit 163 is used for fingerprint recognition to verify the user identity.

With continued reference to FIG. 9 and FIG. 24, in an embodiment, the knob 10 further includes a vibration motor 17, and the vibration motor 17 is electrically connected to the first circuit board 14.

Specifically, an eccentric wheel is disposed on a motor shaft; when the motor rotates, the mass point of the center of the eccentric wheel is not on the rotating center of the motor, so that the motor is in a continuous unbalance state, and vibration is caused by the inertia effect. In an embodiment, when the controller 141 detects that the encoder 15 rotates, the user touches the display panel 20, or the user presses the pressure sensing unit 162, the vibration motor 17 may be controlled to vibrate.

With continued reference to FIG. 9, the knob 10 may further include a decorative rubber ring 194, when the knob 10 is assembled into a whole, the decorative rubber ring 194 is sleeved on the periphery of the first housing 191, and the decorative rubber ring 194 protects and decorates the first housing 191. Specifically, the color of the decorative rubber ring 194 can be set by those skilled in the art according to the practical situations, and is not limited herein.

With continued reference to FIG. 24, the knob 10 may further include an electro-acoustic component 18, and the electro-acoustic component 18 is electrically connected to the controller 141; the electro-acoustic component 18 may include a speaker, a microphone, or other components known to those skilled in the art, and is not limited herein.

Figure 25:
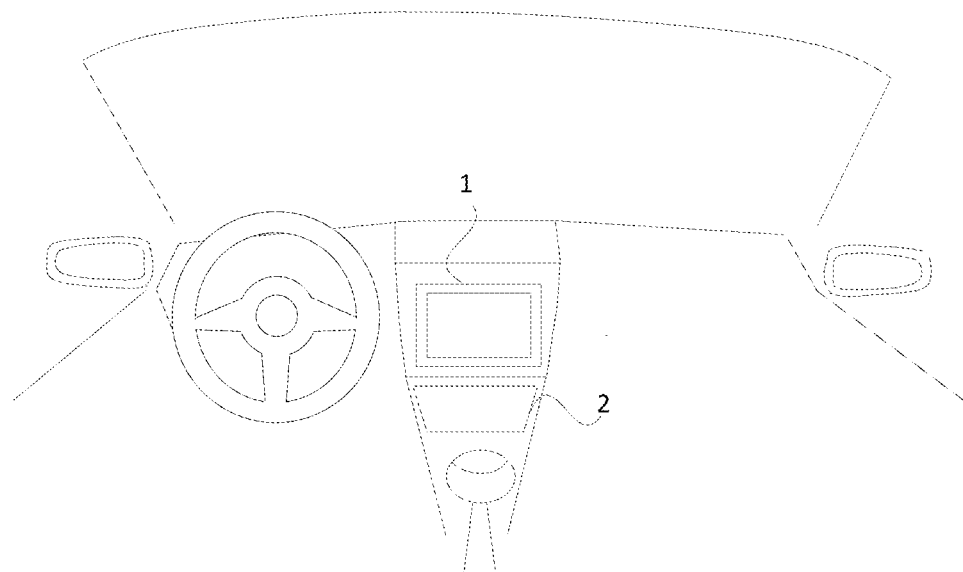
FIG. 25 is a structure diagram of a vehicle according to an embodiment of the present disclosure.

Based on the above concept, the embodiments of the present disclosure further provide a vehicle. FIG. 25 is a structure diagram of a vehicle according to an embodiment of the present disclosure. Referring to FIG. 25, the vehicle includes any one of the display devices described above, and thus the vehicle has corresponding functions and effects.

Figure 26:
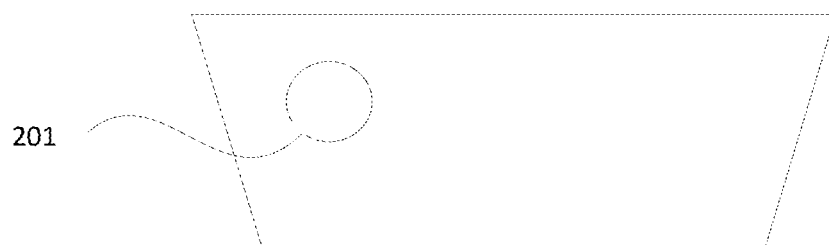
FIG. 26 is a structure diagram of a surface of a center console facing toward a charging groove according to an embodiment of the present disclosure.
Figure 27:
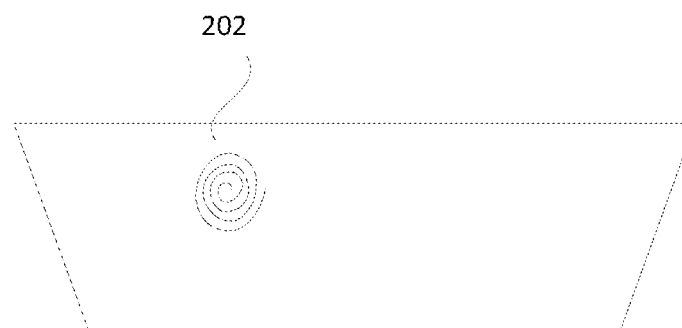
FIG. 27 is a structure diagram of a surface of a center console away from a charging groove according to an embodiment of the present disclosure.

FIG. 26 is a structure diagram of a surface of a center console facing toward a charging groove according to an embodiment of the present disclosure. FIG. 27 is a structure diagram of a surface of a center console away from a charging groove according to an embodiment of the present disclosure. Referring to FIG. 25 to FIG. 27, in an embodiment, the vehicle further includes a center console 2, where the center console 2 is provided with a charging groove 201, and a third charging coil 202 is disposed on a side of the center console 2 away from the charging groove 201 and at a position corresponding to the charging groove 201.

Specifically, when the knob 10 is placed in the charging groove 201, an orthographic projection of the first charging coil 12 on the center console 2 at least partially overlaps an orthographic projection of the third charging coil 202 on the center console 2; in an embodiment, a deviation between an orthographic projection of the first charging coil 12 on the center console 2 and an orthographic projection of the third charging coil 202 on the center console 2 is less than a third predetermined tolerance; a specific value of the third preset tolerance may be set by those skilled in the art according to the practical situations, and is not limited herein. The third charging coil 202 can charge the battery 13 through the first charging coil 12, and a principle that the third charging coil 202 charges the battery 13 through the first charging coil 12 is the same as a principle that the second charging coil 60 charges the battery 13 through the first charging coil 12, which is not described herein again.

Specifically, the number and depth of the charging groove 201 can be set by those skilled in the art according to the practical situations, and are not limited herein. It should be understood that the charging groove 201 can prevent the knob 10 from sliding and provides a charging position indication to the user.

Figure 28:
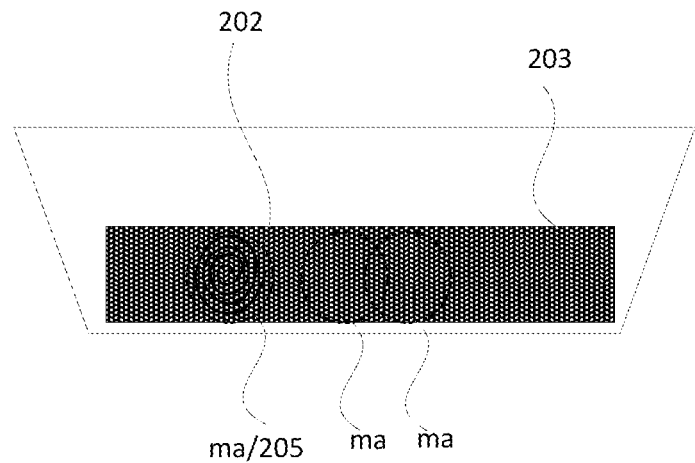
FIG. 28 is a structure diagram of a surface of a side of a center console according to an embodiment of the present disclosure.
Figure 29:
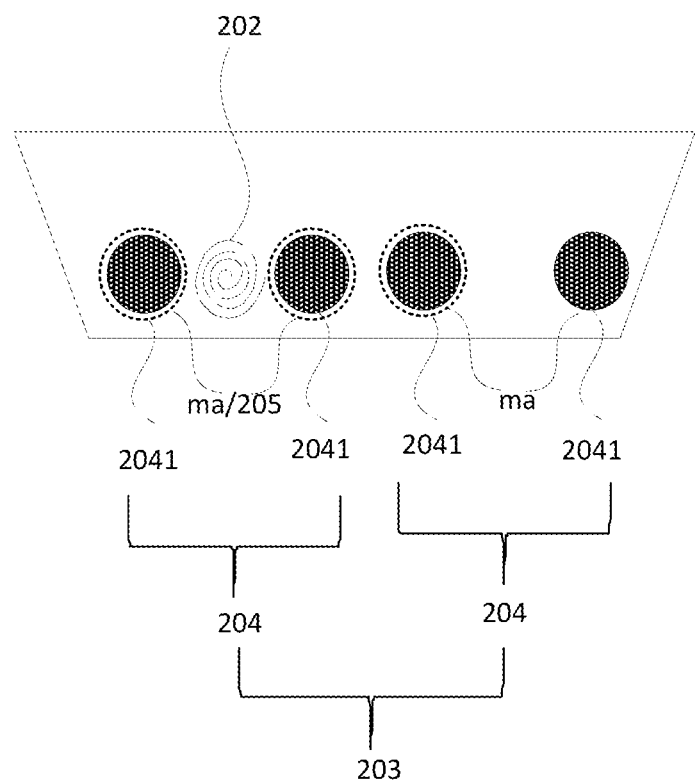
FIG. 29 is a structure diagram of a surface of a side of another center console according to an embodiment of the present disclosure.

FIG. 28 is a structure diagram of a surface of a side of a center console according to an embodiment of the present disclosure. FIG. 29 is a structure diagram of a surface of a side of another center console according to an embodiment of the present disclosure. Referring to FIG. 25, FIG. 28, and FIG. 29, in an embodiment, the vehicle further includes a center console 2, where the center console 2 is provided with a third magnetic adhering structure 203, and the third magnetic adhering structure 203 includes at least one second magnetic adhering region ma; when the knob 10 is adhered to any one second magnetic adhering region ma, the third magnetic adhering structure 203 and the knob 10 are disposed on two sides of the center console 2.

Specifically, the third magnetic adhering structure 203 is disposed on a surface of a side of the center console 2 away from a driving seat. When the knob 10 is adhered to the center console 2, the knob 10 is disposed on a surface of a side of the center console 2 facing towards to the driving seat. Specifically, the third magnetic adhering piece may be a magnet, an energized coil, or other magnets known to those skilled in the art, and is not limited herein. The third magnetic adhering structure 203 may be an entire surface structure and the third magnetic adhering structure has a size much larger than a size of the first magnetic adhering piece 11, as shown in FIG. 28; and the third magnetic adhering structure 203 may further include a plurality of third magnetic adhering pieces 204, as shown in FIG. 29. The specific shape and structure of the third magnetic adhering piece 204 can be set by those skilled in this art according to the practical conditions, and is not limited herein. Exemplarily, the first magnetic adhering piece can be an integral structure and can have a shape of circle, ring, rectangle, or the like. Exemplarily, the third magnetic adhering piece 204 further includes a plurality of third magnets 2041, the plurality of third magnets 2041 may be arranged regularly, for example, the plurality of third magnets are arranged in a straight line shape, a broken line shape, a wave shape or a ring shape (as shown in FIG. 29); the plurality of third magnets 2041 may also be irregularly arranged. It should be noted that a specific number of the third magnetic adhering pieces 204 and the third charging coils 202 can be set by those skilled in the art according to practical situations, and is not limited herein.

With continued reference to FIG. 27 and FIG. 28, the knob 10 further includes a first charging coil 12 and a battery 13, and the battery 13 is electrically connected to the first charging coil 12; the center console 2 is further provided with at least one third charging coil 202; the third charging coil and the third magnetic adhering structure 203 are disposed on a same side of the center console 2; and the second magnetic adhering region ma includes at least one second charging region 205; when the knob 10 is magnetically adhered to the second charging region 205, an orthographic projection of the third charging coil 202 on the center console 2 at least partially overlaps an orthographic projection of the first charging coil 14 on the center console 2.

In an embodiment, when the knob 10 is magnetically adhered to the second charging region 205, the orthographic projection of the third charging coil 202 on the center console 2 overlaps the orthographic projection of the first charging coil 14 on the center console 2. Thus, the charging efficiency can be increased.

In an embodiment, an alignment mark is disposed on a surface of a side of the center console 2 facing towards the driving seat and at a position opposite to the second charging region 205, so as to prompt the position of the second charging region 205.

In an embodiment, when the knob 10 is magnetically adhered to the second charging region 205, the third magnetic adhering piece 204 magnetically adhered to the first magnetic adhering piece 11 is an active second magnetic adhering piece, and the third charging coil 202 for charging the battery 14 is an active third charging coil; a relative positional relationship of the active third magnetic adhering piece and the active third charging coil is the same as a relative positional relationship of the first magnetic adhering piece 11 and the first charging coil 12.

Specifically, the relative position relationships being the same refers to that, when the knob 10 is adhered to the center console 2 through the magnetic force, the orthographic projection of the active third magnetic adhering piece on the center console 2 and the orthographic projection of the first magnetic adhering piece 11 on the center console 2 overlap, and at the same time, the orthographic projection of the first charging coil 12 on the center console 2 and the orthographic projection of the third charging coil 202 on the center console 2 overlap. In this way, when the knob 10 is adhered to the center console 2 through the magnetic force, the third charging coil 202 can supply power to the battery 13 through the first charging coil 12.

It should be understood that the display panel includes a plurality of first magnetic adhering regions MA, the plurality of first magnetic adhering regions MA includes at least one first charging region 33, and the first charging region 33 has a prompt message at a corresponding position. The center console 2 of the vehicle is also provided with an region with a magnetic adhering function and/or a charging function, the charging can be implemented when the knob 10 is placed in the charging groove 201, the magnetic adhering can be implemented when the first magnetic adhering piece 11 of the knob 10 is adhered to the second magnetic adhering region ma, and the magnetic adhering and the charging can be implemented when the first magnetic adhering piece 11 of the knob 10 is adhered to the second charging region 205. In an practical application, when the knob 10 is adhered to the first charging region 33 of the display panel 20, the knob 10 is placed in the charging groove on the center console 2, or the knob 10 is adhered to the second charging region 205 of the center console 2, the battery 13 in the knob 10 can be charged. When the knob 10 is only magnetically adhered without charging, the knob 10 may be adhered to the first magnetic adhering region MA of the display panel 20 or the knob 10 may be adhered to the second magnetic adhering region MA, which does not have a charging function, of the center console 2.

It should be noted that the third magnetic adhering structure 203 shown in FIG. 28 actually includes a plurality of second magnetic adhering regions ma. However, since it is difficult to divide all of the plurality of second magnetic adhering regions ma, only three second magnetic adhering regions ma are shown exemplarily in FIG. 28.

It should be understood that vehicle may also be provided with vehicle components known to those skilled in the art, such as the air conditioner, the speakers, and the like. When the knob 10 is adhered to the center console 2 or the display panel 20 through the magnetic force, the electrical appliances in the vehicle can be controlled by rotating the knob 10.

It should be noted that the above are only some embodiments of the present disclosure and the technical principles used therein. It will be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display device, comprising a knob and a display panel;
wherein the knob comprises a first magnetic adhering piece;
the display device further comprises a second magnetic adhering structure, and the second magnetic adhering structure is disposed on a non-light exiting side of the display panel;
the second magnetic adhering structure comprises a plurality of first magnetic adhering regions and a plurality of second magnetic adhering pieces, at least two first magnetic adhering regions among the plurality of first magnetic adhering regions are not overlapped and any two of the plurality of second magnetic adhering pieces are disposed at different positions; and in a case where the knob is magnetically adhered to any one of the plurality of first magnetic adhering regions, the knob is disposed on a light exiting side of the display panel; and
the display panel comprises a central region and an edge region surrounding the central region, and a distribution density of second magnetic adhering pieces in the central region is smaller than a distribution density of second magnetic adhering pieces in the edge region; and a ratio of an area of the central region to an area of the edge region has a range from 2:1 to 3:1.

2. The display device of claim 1, wherein the second magnetic adhering structure and the display panel have a same size.

3. The display device of claim 1, wherein the display panel comprises a liquid crystal display panel, the display device further comprises a backlight module, and the second magnetic adhering structure is disposed on a backplane of the backlight module; or,
the display panel comprises an organic light emitting display panel, the display device comprises a first housing, the first housing is disposed on a non-light exiting side of the organic light emitting display panel, and the second magnetic adhering structure is disposed on the first housing.

4. The display device of claim 1, wherein the knob further comprises a first charging coil and a battery, and the battery is electrically connected to the first charging coil; the display device further comprises at least one second charging coil; and
the plurality of first magnetic adhering regions comprises at least one first charging region; in a case where the knob is magnetically adhered to the first charging region, an orthographic projection of the first charging coil on the display panel at least partially overlaps an orthographic projection of the second charging coil on the display panel.

5. The display device of claim 4, wherein the display panel comprises a substrate and a plurality of metal layers disposed on the substrate, and an insulating layer is disposed between adjacent metal layers among the plurality of metal layers for insulation; and the second charging coil is disposed in a same layer as one of the plurality of metal layers.

6. The display device of claim 5, wherein the display panel comprises a substrate and a plurality of metal layers disposed on the substrate, and an insulating layer is disposed between adjacent metal layers among the plurality of metal layers for insulation; and
the second charging coil comprises at least two coil subsections, and two adjacent coil subsections among the at least two coil subsections are contacted and electrically connected along a direction perpendicular to the substrate; the at least two coil subsections are disposed in different layers, and each coil subsection among the at least two coil subsections is disposed in a same layer as one of the plurality of metal layers.

7. The display device of claim 4, wherein the display panel comprises a display region and a non-display region surrounding the display region, the second charging coil is disposed in the non-display region, and the second charging coil is disposed on a light exiting side of the display panel.

8. The display device of claim 4, wherein the second charging coil is disposed on a non-light exiting side of the display panel.

9. A display device of claim 4, wherein the display panel is provided with a hole structure, a functional module is disposed in the hole structure, and an orthographic projection of the first charging region on the display panel at least partially overlaps the hole structure.

10. The display device of claim 4, wherein the display panel comprises a display region and a non-display region surrounding the display region, and the first charging region is disposed in the display region; and in a case where the display panel displays a control page, the display panel displays an alignment mark at a position corresponding to the first charging region.

11. The display device of claim 4, wherein in a case where the knob is magnetically adhered to the first charging region, a second magnetic adhering piece to which the first magnetic adhering piece is magnetically adhered is an active second magnetic adhering piece, and a second charging coil for charging the battery is an active second charging coil; and a relative position relationship of the active second magnetic adhering piece and the active second charging coil is the same as a relative position relationship of the first magnetic adhering piece and the first charging coil.

12. The display device of claim 1, wherein the knob further comprises a first circuit board; the display device further comprises a main control board; and each of the first circuit board and the main control board is provided with a wireless communication module.

13. The display device of claim 12, wherein the knob further comprises an auxiliary display panel; the auxiliary display panel is electrically connected to the first circuit board, and the auxiliary display panel is used for displaying image information sent by the main control panel through the wireless communication module.

14. The display device of claim 13, wherein the auxiliary display panel comprises at least one of a touch unit, a pressure sensing unit, or a fingerprint recognition unit.

15. The display device of claim 12, wherein the knob further comprises an encoder, the encoder is electrically connected to the first circuit board, and the encoder is used for sending a rotation signal to the main control board through the wireless communication module.

16. The display device of claim 12, wherein the knob further comprises a vibration motor, and the vibration motor is electrically connected to the first circuit board.

17. A vehicle, comprising a display device, wherein the display device comprises a knob and a display panel;
wherein the knob comprises a first magnetic adhering piece;
the display device further comprises a second magnetic adhering structure and a plurality of second magnetic adhering pieces, and the second magnetic adhering structure is disposed on a non-light exiting side of the display panel;
the second magnetic adhering structure comprises a plurality of first magnetic adhering regions, and at least two first magnetic adhering regions among the plurality of first magnetic adhering regions are not overlapped and any two of the plurality of second magnetic adhering pieces are disposed at different positions; and in a case where the knob is magnetically adhered to any one of the plurality of first magnetic adhering regions, the knob is disposed on a light exiting side of the display panel; and
the display panel comprises a central region and an edge region surrounding the central region, and a distribution density of second magnetic adhering pieces in the central region is smaller than a distribution density of second magnetic adhering pieces in the edge region; and a ratio of an area of the central region to an area of the edge region has a range from 2:1 to 3:1.

18. The vehicle of claim 17 further comprising a center console, wherein the center console is provided with a charging groove, and a third charging coil is disposed on a side of the center console away from the charging groove and at a position corresponding to the charging groove.

19. The vehicle of claim 17, further comprising a center console, wherein the center console is provided with a third magnetic adhering structure, and the third magnetic adhering structure comprises at least one second magnetic adhering region; in a case where the knob is adhered to any one second magnetic adhering region, the third magnetic adhering structure and the knob are disposed on two sides of the center console.

20. The vehicle of claim 19, wherein the knob further comprises a first charging coil and a battery, and the battery is electrically connected to the first charging coil;
   the center console is further provided with at least one third charging coil; the third charging coil and the third magnetic adhering structure are disposed on a same side of the center console; and
   the second magnetic adhering region comprises at least one second charging region; in a case where the knob is magnetically adhered to the second charging region, an orthographic projection of the third charging coil on the center console at least partially overlaps an orthographic projection of the first charging coil on the center console.

* * * * *